US009645589B2

(12) United States Patent
Leen et al.

(10) Patent No.: US 9,645,589 B2
(45) Date of Patent: May 9, 2017

(54) HVAC CONTROL WITH COMFORT/ECONOMY MANAGEMENT

(71) Applicant: Honeywell International Inc., Morristown, NJ (US)

(72) Inventors: Cary Leen, Hammond, WI (US); Stan Zywicki, III, Eden Prairie, MN (US); Robert J. Schnell, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 254 days.

(21) Appl. No.: 14/048,613

(22) Filed: Oct. 8, 2013

(65) Prior Publication Data

US 2014/0039692 A1 Feb. 6, 2014

Related U.S. Application Data

(63) Continuation of application No. 13/006,402, filed on Jan. 13, 2011, now Pat. No. 8,560,127.

(51) Int. Cl.
*G05D 23/19* (2006.01)
*F24F 11/00* (2006.01)
(Continued)

(52) U.S. Cl.
CPC ........ *G05D 23/1917* (2013.01); *F24F 11/006* (2013.01); *G05D 19/02* (2013.01);
(Continued)

(58) Field of Classification Search
USPC ........................................................ 236/46 R
See application file for complete search history.

(56) References Cited

U.S. PATENT DOCUMENTS 3,472,452 A 10/1969 Beeston, Jr.
3,581,985 A * 6/1971 Thorsteinsson et al. ... 236/68 B
(Continued)

FOREIGN PATENT DOCUMENTS

CA 2202008 10/1998
EP 0196069 10/1986
(Continued)

OTHER PUBLICATIONS

Harrold, M.V. and Lush, D.M., "Automatic Controls in Building Services", May 1988, IEE Proceedings, vol. 135, Pt. B, No. 3, p. 105-133.*

(Continued)

*Primary Examiner* — Mohammad Ali
*Assistant Examiner* — Kelvin Booker
(74) *Attorney, Agent, or Firm* — Seager, Tufte & Wickhem, LLP

(57) ABSTRACT

A programmable thermostat may be configured to control one or more pieces of HVAC equipment in accordance with a programmable schedule. The HVAC equipment may be capable of modifying a temperature of an inside space with at least a primary stage and an auxiliary stage. The programmable thermostat may include a memory for storing operating parameters of the programmable thermostat, a user interface configured to accept modification of operating parameters, including one or more droop values, and a controller coupled to the memory and the user interface. The controller attempts to control the temperature of the inside space with the primary stage of the HVAC equipment, but if the temperature of the inside space deviates from a desired setpoint temperature value by more than or equal to a programmed droop value, the controller may activate the auxiliary stage. In some instances, the user interface of the programmable thermostat may be configured to allow a user (Continued)

to selectively override one or more of the applicable droop values. In some instances, the droop value that is used may depend on the current operation condition of the controller.

16 Claims, 14 Drawing Sheets

(51) Int. Cl.
*G05D 19/02* (2006.01)
*F25B 29/00* (2006.01)

(52) U.S. Cl.
CPC ...... *G05D 23/1904* (2013.01); *F24F 11/0086* (2013.01); *F24F 2011/0064* (2013.01); *F25B 29/00* (2013.01)

(56) References Cited

U.S. PATENT DOCUMENTS 3,665,360 A * 5/1972 Norden .......................... 337/100
3,784,094 A * 1/1974 Goodwin .................... 236/68 C
3,817,453 A * 6/1974 Pinckaers ................... 236/68 C
3,972,471 A * 8/1976 Ziegler ....................... 236/46 R
3,979,708 A * 9/1976 Thompson .................... 337/107
3,988,708 A * 10/1976 Thorsteinsson et al. ..... 337/379
4,016,520 A * 4/1977 Hummel ....................... 337/100
4,089,462 A * 5/1978 Bradford ................ G05D 23/20
165/257
4,114,681 A * 9/1978 Denny ................... G05D 23/30
165/265
4,176,785 A * 12/1979 Allard et al. ............... 236/46 R
4,187,543 A 2/1980 Healey et al.
4,205,381 A 5/1980 Games et al.
4,215,408 A * 7/1980 Games ................... G05D 23/20
165/211
4,223,831 A 9/1980 Szarka
4,228,511 A * 10/1980 Simcoe et al. ................ 700/278
4,235,368 A * 11/1980 Neel ............................... 236/94
4,251,025 A 2/1981 Bonne et al.
4,253,153 A 2/1981 Bitterli et al.
4,266,599 A 5/1981 Saunders et al.
4,270,693 A * 6/1981 Hayes .......................... 236/46 F
4,300,199 A * 11/1981 Yoknis et al. ................ 700/278
4,314,441 A 2/1982 Yannone et al.
4,329,138 A 5/1982 Riordan
4,334,855 A 6/1982 Nelson
4,335,847 A 6/1982 Levine
4,338,791 A * 7/1982 Stamp et al. ................... 62/160
4,340,355 A 7/1982 Nelson et al.
4,341,345 A 7/1982 Hammer et al.
4,347,974 A * 9/1982 Pinckaers et al. .......... 236/46 R
4,366,534 A * 12/1982 Kompelien ............ G05B 11/28
236/46 F
4,373,897 A 2/1983 Torborg
4,386,649 A * 6/1983 Hines et al. .................. 165/239
4,387,763 A 6/1983 Benton
4,388,692 A * 6/1983 Jones ................... F24F 11/0009
165/238
4,421,268 A 12/1983 Bassett et al.
4,429,829 A * 2/1984 Dutton ................... G05D 23/20
236/3
4,435,149 A 3/1984 Astheimer
4,439,139 A 3/1984 Nelson et al.
4,442,972 A * 4/1984 Sahay et al. ............... 236/1 EA
4,489,882 A * 12/1984 Rodgers ...................... 236/78 D
4,502,625 A 3/1985 Mueller
4,531,064 A 7/1985 Levine
4,533,315 A 8/1985 Nelson
4,577,278 A 3/1986 Shannon
4,598,764 A * 7/1986 Beckey ............... F24D 19/1039
165/242
4,656,835 A * 4/1987 Kidder et al. .................. 62/175
4,685,614 A 8/1987 Levine
4,686,060 A 8/1987 Crabtree et al.
4,688,547 A 8/1987 Ballard et al.
4,702,413 A 10/1987 Beckey et al.
4,703,795 A 11/1987 Beckey
4,708,636 A 11/1987 Johnson
4,729,207 A 3/1988 Dempsey et al.
4,751,961 A 6/1988 Levine et al.
4,759,498 A 7/1988 Levine et al.
4,767,104 A 8/1988 Plesinger
4,799,176 A * 1/1989 Cacciatore .................... 700/278
4,817,705 A 4/1989 Levine et al.
4,819,587 A 4/1989 Tsutsui et al.
4,828,016 A * 5/1989 Brown et al. ................. 165/239
4,881,686 A * 11/1989 Mehta ......................... 236/46 R
4,892,245 A 1/1990 Dunaway et al.
4,901,918 A * 2/1990 Grald et al. ................ 236/78 D
4,911,358 A 3/1990 Mehta
4,915,615 A 4/1990 Kawamura et al.
4,941,609 A 7/1990 Bartels et al.
4,971,136 A 11/1990 Mathur et al.
5,002,226 A * 3/1991 Nelson ................ G05D 23/275
236/68 B
5,026,270 A 6/1991 Adams et al.
5,070,932 A * 12/1991 Vlasak ................ F24F 11/0009
165/240
5,088,645 A 2/1992 Bell
5,115,967 A 5/1992 Wedekind
5,115,968 A 5/1992 Grald
5,192,020 A * 3/1993 Shah ........................... 236/46 R
5,197,666 A 3/1993 Wedekind
5,211,332 A * 5/1993 Adams ............... G05D 23/1917
236/78 D
5,240,178 A 8/1993 Dewolf et al.
5,248,083 A 9/1993 Adams et al.
5,259,445 A 11/1993 Pratt et al.
5,270,952 A 12/1993 Adams et al.
5,289,362 A * 2/1994 Liebl et al. ..................... 700/22
5,299,631 A * 4/1994 Dauvergne .................... 165/204
5,314,004 A 5/1994 Strand et al.
5,331,944 A 7/1994 Kujawa et al.
5,340,028 A 8/1994 Thompson
5,347,981 A 9/1994 Southern et al.
5,370,990 A 12/1994 Staniford et al.
5,395,042 A 3/1995 Riley et al.
5,405,079 A 4/1995 Neeley et al.
5,408,986 A 4/1995 Bigham
5,454,511 A * 10/1995 Van Ostrand et al. ..... 236/46 R
5,456,407 A * 10/1995 Stalsberg ........... G05D 23/1917
219/501
5,476,221 A 12/1995 Seymour
5,485,953 A 1/1996 Bassett et al.
5,520,533 A 5/1996 Vrolijk
5,524,556 A 6/1996 Rowlette et al.
5,539,633 A 7/1996 Hildebrand et al.
5,555,927 A 9/1996 Shah
5,590,642 A 1/1997 Borgeson et al.
5,601,071 A 2/1997 Carr et al.
5,607,014 A 3/1997 Van Ostrand et al.
5,611,484 A 3/1997 Uhrich
5,616,995 A 4/1997 Hollenbeck
5,622,310 A 4/1997 Meyer
5,630,408 A 5/1997 Versluis
5,666,889 A 9/1997 Evens et al.
5,676,069 A 10/1997 Hollenbeck
5,680,029 A 10/1997 Smits et al.
5,682,826 A 11/1997 Hollenbeck
5,720,231 A 2/1998 Rowlette et al.
5,732,691 A 3/1998 Maiello et al.
5,791,332 A 8/1998 Thompson et al.
5,806,440 A 9/1998 Rowlette et al.
5,819,721 A 10/1998 Carr et al.
5,822,997 A 10/1998 Atterbury
5,860,411 A 1/1999 Thompson et al.
5,865,611 A 2/1999 Maiello
5,902,183 A 5/1999 D'Souza
5,909,378 A 6/1999 De Milleville
5,977,964 A 11/1999 Williams et al.
5,993,195 A 11/1999 Thompson
6,000,622 A 12/1999 Tonner et al.
6,062,482 A 5/2000 Gauthier et al.

(56) References Cited

U.S. PATENT DOCUMENTS 6,098,893 A 8/2000 Berglund et al.
6,109,255 A 8/2000 Dieckmann et al.
6,216,956 B1 4/2001 Ehlers et al.
6,254,008 B1 7/2001 Erickson et al.
6,260,765 B1 7/2001 Natale et al.
6,283,115 B1 9/2001 Dempsey et al.
6,321,744 B1 11/2001 Dempsey et al.
6,349,883 B1 2/2002 Simmons et al.
6,354,327 B1 3/2002 Mayhew
6,357,870 B1 3/2002 Beach et al.
6,377,426 B2 4/2002 Hugghins et al.
6,402,043 B1 6/2002 Cockerill
6,504,338 B1 1/2003 Eichorn
6,571,817 B1 6/2003 Bohan, Jr.
6,645,066 B2 11/2003 Gutta et al.
6,705,533 B2 3/2004 Casey et al.
6,729,390 B1 5/2004 Toth et al.
6,749,423 B2 6/2004 Fredricks et al.
6,758,909 B2 7/2004 Jonnalagadda et al.
6,764,298 B2 7/2004 Kim et al.
6,769,482 B2 8/2004 Wagner et al.
6,786,225 B1 * 9/2004 Stark et al. ........................ 137/1
6,793,015 B1 9/2004 Brown et al.
6,846,514 B2 1/2005 Jonnalagadda et al.
6,866,202 B2 3/2005 Sigafus et al.
6,880,548 B2 4/2005 Schultz et al.
6,918,756 B2 7/2005 Fredricks et al.
6,923,643 B2 8/2005 Schultz et al.
6,925,999 B2 8/2005 Hugghins et al.
7,024,336 B2 4/2006 Salsbury et al.
7,055,759 B2 6/2006 Wacker et al.
7,073,365 B2 7/2006 Geho et al.
7,099,748 B2 8/2006 Rayburn
7,101,172 B2 9/2006 Jaeschke
7,111,503 B2 9/2006 Brumboiu et al.
7,113,086 B2 9/2006 Shorrock
7,130,719 B2 * 10/2006 Ehlers et al. ................. 700/276
7,185,825 B1 * 3/2007 Rosen ........................ 236/46 C
7,188,779 B2 3/2007 Alles
7,191,826 B2 3/2007 Byrnes et al.
7,216,016 B2 * 5/2007 Van Ostrand ...... G05B 23/0291 236/1 B
7,228,693 B2 6/2007 Helt
7,241,135 B2 7/2007 Munsterhuis et al.
7,293,718 B2 11/2007 Sigafus et al.
7,343,226 B2 * 3/2008 Ehlers et al. ................. 700/276
RE40,437 E 7/2008 Rosen
7,392,661 B2 7/2008 Alles
7,432,477 B2 * 10/2008 Teti .............................. 219/492
7,451,612 B2 11/2008 Mueller et al.
7,469,550 B2 12/2008 Chapman, Jr. et al.
7,555,364 B2 * 6/2009 Poth et al. .................... 700/276
7,580,775 B2 8/2009 Kulyk et al.
7,584,021 B2 9/2009 Bash et al.
7,599,808 B2 10/2009 Weekly
7,644,869 B2 * 1/2010 Hoglund et al. ............. 236/49.1
7,693,809 B2 4/2010 Gray
7,707,428 B2 * 4/2010 Poth et al. .................... 713/184
7,720,621 B2 5/2010 Weekly
7,735,743 B2 6/2010 Jaeschke
7,784,704 B2 8/2010 Harter
7,802,618 B2 * 9/2010 Simon et al. ................. 165/254
7,854,389 B2 12/2010 Ahmed
7,861,547 B2 1/2011 Major et al.
7,861,941 B2 1/2011 Schultz et al.
7,918,406 B2 4/2011 Rosen
7,945,799 B2 * 5/2011 Poth et al. .................... 713/400
7,949,615 B2 * 5/2011 Ehlers et al. ................. 705/412
8,019,567 B2 9/2011 Steinberg et al.
8,027,518 B2 9/2011 Baker et al.
8,032,254 B2 * 10/2011 Amundson et al. .......... 700/276
8,078,325 B2 * 12/2011 Poth ............................. 700/276
8,087,593 B2 * 1/2012 Leen .......................... 236/91 D
8,090,477 B1 1/2012 Steinberg
8,091,795 B1 * 1/2012 McLellan et al. ............. 236/51
8,091,796 B2 * 1/2012 Amundson et al. ............ 236/94
8,141,791 B2 * 3/2012 Rosen ......................... 236/46 C
8,146,584 B2 4/2012 Thompson
8,180,492 B2 5/2012 Steinberg
8,204,628 B2 6/2012 Schnell et al.
8,219,249 B2 7/2012 Harrod et al.
8,346,396 B2 * 1/2013 Amundson et al. .......... 700/276
8,350,697 B2 1/2013 Trundle et al.
8,457,796 B2 6/2013 Thind
8,498,753 B2 7/2013 Steinberg et al.
8,509,954 B2 8/2013 Imes et al.
8,554,376 B1 10/2013 Matsuoka et al.
8,560,127 B2 * 10/2013 Leen et al. .................... 700/278
8,596,550 B2 12/2013 Steinberg et al.
2002/0155405 A1 10/2002 Casey et al.
2004/0117330 A1 * 6/2004 Ehlers .................. F24F 11/0012 705/412
2004/0133314 A1 * 7/2004 Ehlers et al. ................. 700/276
2005/0128067 A1 6/2005 Zakrewski
2005/0159846 A1 * 7/2005 Van Ostrand ...... G05B 23/0291 700/276
2005/0189429 A1 9/2005 Breeden
2006/0186214 A1 * 8/2006 Simon .................. F24F 11/0012 236/1 C
2006/0192021 A1 * 8/2006 Schultz ................ F24F 11/0009 236/1 C
2006/0196953 A1 * 9/2006 Simon ................. F24D 19/1096 236/46 R
2006/0219799 A1 * 10/2006 Schultz ............. G05D 23/1904 236/1 C
2007/0043477 A1 * 2/2007 Ehlers et al. ................. 700/276
2007/0043478 A1 * 2/2007 Ehlers .................. F24F 11/0012 700/276
2007/0068184 A1 * 3/2007 Mueller .................. F24D 15/04 62/260
2007/0235179 A1 * 10/2007 Phillips ......................... 165/244
2007/0239316 A1 10/2007 Jelinek et al.
2007/0267508 A1 * 11/2007 Hoglund ................ F24F 11/006 236/49.1
2008/0054082 A1 * 3/2008 Evans ..................... F24D 12/02 236/91 D
2008/0065926 A1 * 3/2008 Poth et al. .................... 713/500
2008/0098760 A1 5/2008 Seefeldt
2008/0127963 A1 6/2008 Thompson
2008/0183335 A1 * 7/2008 Poth et al. .................... 700/276
2008/0217419 A1 * 9/2008 Ehlers .................... G08B 21/20 236/44 C
2008/0277488 A1 * 11/2008 Cockerill ................ F23N 5/203 236/46 R
2009/0056929 A1 * 3/2009 Mulder ................. F24F 1/0007 165/247
2009/0063065 A1 * 3/2009 Weekly ..................... G06F 1/28 702/64
2009/0063884 A1 * 3/2009 Weekly ................. G06F 1/3203 713/340
2009/0140056 A1 * 6/2009 Leen ........................... 236/49.3
2009/0140062 A1 * 6/2009 Amundson et al. ............ 236/51
2009/0143879 A1 * 6/2009 Amundson et al. ............ 700/83
2009/0143880 A1 * 6/2009 Amundson et al. ............ 700/83
2009/0143916 A1 * 6/2009 Boll et al. ..................... 700/276
2009/0143918 A1 * 6/2009 Amundson et al. .......... 700/278
2009/0171862 A1 7/2009 Harrod et al.
2009/0228712 A1 * 9/2009 Poth et al. .................... 713/184
2009/0308372 A1 12/2009 Nordberg et al.
2010/0006660 A1 * 1/2010 Leen .................. G05D 23/1931 236/51
2010/0025483 A1 2/2010 Hoeynck et al.
2010/0065245 A1 3/2010 Imada et al.
2010/0070084 A1 3/2010 Steinberg et al.
2010/0084482 A1 4/2010 Kennedy et al.
2010/0106305 A1 * 4/2010 Pavlak ................... F24F 11/001 700/276
2010/0211224 A1 8/2010 Keeling et al.
2010/0235004 A1 * 9/2010 Thind .................... G05B 15/02 700/277
2010/0243231 A1 * 9/2010 Rosen .......................... 165/237
2010/0262298 A1 10/2010 Johnson et al.
2011/0046805 A1 2/2011 Bedros et al.

(56) References Cited

U.S. PATENT DOCUMENTS

2011/0185895 A1 8/2011 Freen
2012/0085831 A1 4/2012 Kopp
2012/0095614 A1* 4/2012 DeLayo ........................ 700/300
2012/0116593 A1* 5/2012 Amundson et al. .......... 700/276
2012/0185101 A1* 7/2012 Leen et al. .................... 700/278
2012/0203379 A1* 8/2012 Sloo ..................... F24F 11/0086 700/276
2012/0310416 A1 12/2012 Tepper et al.

FOREIGN PATENT DOCUMENTS

JP 59-106311 6/1984
JP 1-252850 10/1989

OTHER PUBLICATIONS

"BACnet Direct Digital Control Systems for HVAC," Whole NOSC Facility Modernization, Greensboro, NC, GRN98471, 40 pages, Aug. 2009.
Aprilaire "Electronic Thermostats Model 8355 7 Day Programmable 2 Heat/2 Cool Heat Pump, User's Manual, Installation, and Programming," pp. 1-16, Dec. 2000.
Bishop, "Adaptive Identification and Control of HVAC Systems," USA CER, Technical Report E-85, 50 pages, Sep. 1985.
Braeburn, "Model 5200 Premier Series Programmable Thermostats. Up to 2 Heat/2 Cool 7 Day, 5-2 Day or Non-Programmable Conventional and Heat Pump," 11 pages, 2011.
Braeburn, "Model 5300 Premier Series Universal Auto Changeover, Up to 3 Heat/2 Cool Heat Pump or 2 Heat/2Cool Conversion Thermostat, User Manual," 2009.
California Energy Commission, "Buildings End-Use Energy Efficiency, Alternatives to Compressor Cooling," 80 pages, Jan. 2000.
Carrier, "SYSTXCCUIZ01-V Infinity Control, Installation Instructions," pp. 1-20, 2012.
Carrier, "TB-PAC, TB-PHP Base Series Programmable Thermostats, Installation Instructions," 4 pages, 2012.
DeLeeuw, "Ecobee Wifi Enabled Smart Thermostat Part 2: The Features Review," 7 pages, Apr. 1, 2014.
Ecobee, "Smart Si Thermostat User Manual," 44 pages, 2012.
Ecobee, "Smart Thermostat Installation Manual," pp. 1-36, 2011.
Ecobee, "Smart Thermostat User Manual," 20 pages, 2010.
Federspiel et al., "User Adaptable Comfort Control for HVAC Systems," Proceedings of the 1992 American Control Conference, pp. 2312-2319, Jun. 24-26, 1992.
Fong et al., "A Robust Evolutionary Algorithm for HVAC Engineering Optimization," HVAC C&R Research, vol. 14, No. 5, pp. 683-705, Sep. 2008.
Gao, "The Self-Programming Thermostat: Optimizing Setback Schedules Based on Home Occupancy Patterns," BuildSys '09, 6 pages, Nov. 3, 2009.
Hai, "Omnistat RC-Series Electronic Communicating Thermostats," 2 pages, prior to Jan. 13, 2011.
Honeywell, "Automation and Control Solutions Installation Guide", pp. 1-38, 2012. (This reference was cited in U.S. Pat. No. 8,554,376, issued Oct. 8, 2013.
Honeywell, "Automation and Control Systems", pp. 1-29, 2012. (This reference was cited in U.S. Pat. No. 8,554,376, issued Oct. 8, 2013.
Honeywell, "45.801.175- Amplification Gas/Air Module for VK4105R/VK8105R Gas Controls," 8 pages, prior to Oct. 18, 2006.
Honeywell, "FocusPRO 6000 Series Programmable Thermostat, User Guide," 24 pages, Dec. 2013.
Honeywell, "FocusPRO TH6000 Series Programmable Thermostat, Operating Manual," 26 pages, Mar. 2011.
Honeywell, "FocusPRO Wi-Fi TH6000 Series Programmable Thermostat, Installation Guide," 36 pages, 2012.
Honeywell, "Perfect Climate Comfort Center Control System, Product Data," 44 pages, Apr. 2001.
Honeywell, Prestige THX9321/9421 Operating Manual, 120 pages, Jul. 2011.
Honeywell, "T8611G Chronotherm IV Deluxe Programmable Heat Pump Thermostats, Installation Instructions," 12 pages, 2002.
Honeywell, "T8624D Chronotherm IV Deluxe Programmable Thermostat, Product Data," 20 pages, Oct. 1997.
Honeywell, "THX9321 Prestige 2.0 and THX9421 Prestige IAQ with EIM," Product Data, 160 pages, Apr. 2013.
Honeywell, "VisionPRO IAQ, Installation Guide," 24 pages, Jul. 2009.
Honeywell, "VisionPRO TH8000 Series Installation Guide," 12 pages, 2012.
Honeywell, "VisionPRO TH8000 Series Operating Manual," 64 pages, 2007.
Honeywell, "VK41..R/VK81..R Series, Gas Controls with Integrated Gas/Air for Combined Valve and Ignition System," 6 pages.
http://www.ecobee.com/solutions/whats-new/, "Introducing the New Smart Si Thermostat," 1 page, printed Apr. 1, 2014.
http://www.regal-beloit.comgedrafthtml., "Regal-Beloit ECM, formerly GE ECM, Draft Inducer Motors, (44 Frame)," 1 page, printed Apr. 26, 2006.
Kuntze et al., "A New Fuzzy-Based Supervisory Control Concept for the Demand-Responsive Optimization of HVAC Control Systems," Proceedings of the 37$^{th}$ IEEE Conference on Decision & Control, Tampa, Fl, pp. 4258-4263, 1998.
Lennox, "ComfortSense 5000 Series Models L5711U and 5732U Programmable Touch Screen Thermostats," Owner's Guide, 32 pages, Feb. 2008.
Lennox, "G61MPV Series Unit, Installation Instructions," 2 pages, Oct. 2006.
Lennox, "G61MPV Series Unit, Installation Instructions," 68 pages, Jan. 2010.
Lennox, "Homeowner's Manual, Comfortsense 7000 Series, Model L7742U Touch Screen Programmable Thermostat," 15 pages, May 2009.
Lennox, "icomfort Touch Thermostat, Homeowner's Manual," Controls 506053-01, 20 pages, Dec. 2010.
Lu et al., "The Smart Thermostat: Using Occupancy Sensors to Save Energy in Homes," Sensys' 10, 14 pages, Nov. 3-5, 2010.
Luxpro, "Luxpro PSPU732T 3 Heating and 2 Cooling with Automatic Humidity Control and Dual Fuel Switch, Instruction Manual," 48 pages, downloaded Apr. 5, 2014.
Robertshaw, "9620 7 Day Programmable 2 Heat/2Cool User's Manual," 13 pages, 2001.
Robertshaw, "9801i2, 9825i2 Deluxe Programmable Thermostats, User's Manual," 36 pages, Jul. 17, 2006.
Trane, "ComfortLink II Installation Guide," 18-HD64D1-3, 20 pages, Aug. 2011.
Trane, "Communicating Thermostats for Fan Coil Control Echelon Version X13511543020, BACnet MS-TP Version X13511543010, User Guide," 32 pages, May 3, 2011.
Trane, "TCONT600AF11MA Programmable Comfort Control, Installation Instructions," Pub. No. 18-HD25D20-3, 16 pages, 2006.
Utkin et al., "Automobile Climate Control Using Sliding Mode," IEEE International Electric Machines and Drives Conference, 18 pages, Jun. 17-20, 2001.
Venstar, "Commercial Thermostat T2900 7-Day Programmable Up to 3-Heat & 2 Cool, Owner's Manual," 113 pages, Apr. 2008.
Venstar, "Residential Thermostat T5800 Owner's Manual and Installation Instructions," 64 pages, downloaded Apr. 9, 2014.
Washington State University, Extension Energy Program, "Electric Heat Lock Out on Heat Pumps," pp. 1-3, Apr. 2010.
White Rodgers, "Emerson Blue Wireless Comfort Interface 1F98EZ-1621 Homeowner User Guide," 28 pages, downloaded Apr. 5, 2014.
www.networkthermostat.com, "Net/X Wifi Thermostat," 2 pages, 2012.
Yan et al., "Iterative Learning Control in Large Scale HVAC System," IEEE Proceedings of the 8$^{th}$ World Congress on Intelligent Control and Automation, Jul. 6-9, 2010, Jinan, China, 2010.
Zaheer-Uddin et al., "Optimal Control of Time-Scheduled Heating, Ventilating and Air Conditioning Processes in Buildings," Energy Conversion & Management, vol. 41, pp. 49-60, 2000.

(56) References Cited

OTHER PUBLICATIONS

Zaheer-Uddin, "Digital Control of a Heat Recovery and Storage System," Heat Recovery Systems & CHP, vol. 10, No. 5/6, pp. 583-593, 1990.

* cited by examiner

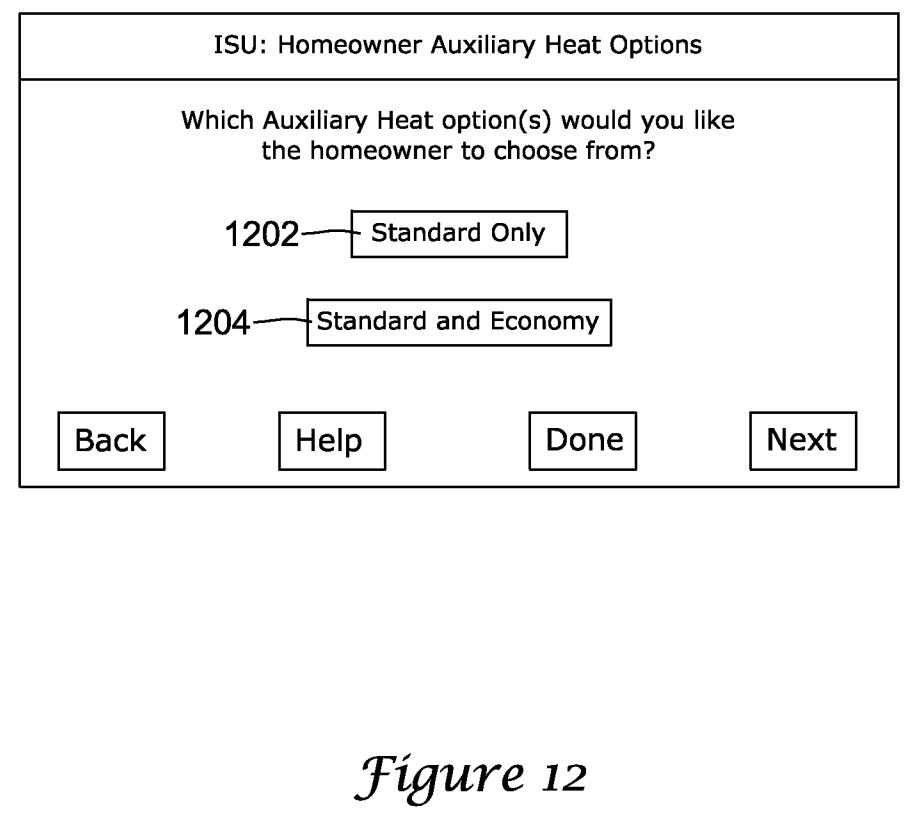

ISU: Homeowner Auxiliary Heat Options

Which Auxiliary Heat option(s) would you like the homeowner to choose from?

1202 Standard Only

1204 Standard and Economy

Back

Help

Done

Next

*Figure 12*

HVAC CONTROL WITH COMFORT/ECONOMY MANAGEMENT

This is a continuation application of co-pending U.S. patent application Ser. No. 13/006,402, filed Jan. 13, 2011, entitled "HVAC CONTROL WITH COMFORT/ECONOMY MANAGEMENT", which is incorporated herein by reference.

TECHNICAL FIELD

The disclosure pertains generally to HVAC control, and more particularly, to control of HVAC systems with multiple stages of heating and/or cooling.

BACKGROUND

Heating, ventilation, and/or air conditioning (HVAC) systems are often used to control the comfort level within a building or other structure. Many HVAC systems include a controller that activates and deactivates one or more HVAC units or components of the HVAC system to affect and control one or more environmental conditions within the building. These environmental conditions can include, but are not limited to, temperature, humidity, and/or ventilation. In many cases, such an HVAC controller may include, or have access to, one or more sensors, and may use parameters provided by the one or more sensors to control the one or more HVAC components to achieve desired programmed or set environmental conditions.

An HVAC controller may be equipped with a user interface that allows a user to monitor and adjust the environmental conditions at one or more locations within the building. With more modern designs, the interface typically includes a display panel, such as a liquid crystal display panel, inset within a housing that contains a microprocessor as well as other components of the HVAC controller. In some designs, the display panel may be a touch sensitive display panel structured to accept user input. In some designs, the user interface may permit the user to program the controller to activate on a certain schedule determined by the user. For example, the interface may include a routine that permits the user to change the temperature at one or more times during a particular day and/or group of days. Such a programmable schedule may help reduce energy consumption of the HVAC system by changing the setpoint to an energy saving set back temperature during certain times, such as when the building or space is expected to be unoccupied or when the occupants are expected to be sleeping.

An HVAC system may be equipped to effect temperature changes in a building in multiple modes and/or with multiple stages. For example, an HVAC system may include a heat pump to extract heat from outside air and/or a geothermal reservoir and deliver the heat to a residence as a primary source, and also include auxiliary electrical resistance heaters to provide heat to the residence when the heat pump and/or other source is unable to deliver sufficient heat. In such an example, the auxiliary heat may be significantly more expensive to operate than the primary heat. In another example, a heating unit such as a furnace may include multiple stages, such a low-fire stage and a high-fire state. The cost per unit of heat delivered may or may not be greater for the high-fire stage as compared with the low fire stage. For consistency in nomenclature, an "auxiliary" source of heating or cooling may be used in this disclosure to denote a device, stage, mode, etc. of an HVAC system that provides heating or cooling at a greater unit cost than another source in the system, which may be described as a "primary" source.

At least three scenarios or conditions may be envisioned when the use of auxiliary heat may be desired. A first situation is when the HVAC system is tasked with maintaining a steady state temperature, but the primary heat source is unable to keep up with heat loss from the space, and thus, auxiliary heat is called upon to supplement or replace the primary heat. A second case is when a setpoint is manually increased. The primary heat source may be capable of moving the temperature to the new setpoint, but the time required to do so may be considered unacceptably long, in which case an auxiliary heat may be called upon to hasten the temperature change. A third scenario may occur when the system is responding to a programmed setpoint change (e.g., from a "sleep" to "wake" period of a programmed schedule), and the primary heat source may be unable to move the temperature to the higher setpoint by the desired time.

Because auxiliary heat may be more expensive than primary or lower-stage heat, a homeowner/building superintendent/etc. may be willing to sacrifice some comfort in favor of economy if it is possible to do so by avoiding and/or delaying the use of auxiliary heat. There is a need for improved devices and control methods to manage this kind of trade-off between comfort and economy.

SUMMARY

The disclosure relates generally to Heating, Ventilation, and Air Conditioning (HVAC) control, and more particularly, to HVAC control of HVAC systems with multiple stages of heating and/or cooling. In one illustrative embodiment, a programmable thermostat may be configured to control one or more pieces of HVAC equipment in accordance with a programmable schedule. The HVAC equipment may be capable of modifying a temperature of an inside space with at least a primary stage and an auxiliary stage. In some instances, the programmable thermostat may include a memory for storing operating parameters of the programmable thermostat, a user interface configured to accept modification of operating parameters including one or more droop values, and a controller coupled to the memory and the user interface.

In some instances, the controller may be programmed to activate the HVAC equipment to attempt to control the temperature of the inside space under at least one of three conditions. These conditions may include, for example, a steady state condition, a programmed recovery condition and a manual setpoint change condition. The controller may be programmed to attempt to control the temperature of the inside space with the primary stage of the HVAC equipment during each of these three conditions, but if the temperature of the inside space deviates from a desired setpoint temperature value by more than or equal to an amount related to an applicable droop value, the controller may activate the auxiliary stage. The applicable droop value may depend on, for example, which of the three conditions the controller is currently operating under, and/or a user's comfort versus economy selection or setting.

In some cases, the controller may allow a user to directly change, set or otherwise influence the applicable droop value, which may override one or more installer programmed droop values. In some instances, the user interface of the programmable thermostat may allow a user to select between, for example, a standard, a comfort, and/or an economy control option, and depending on the selection, the controller may determine an appropriate droop value, which in some cases may depend on which of the three conditions the controller is currently operating under.

The above summary is not intended to describe each and every disclosed illustrative example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which:

FIG. 12 is a schematic illustration of a touch screen displaying user interface elements for allowing an installer to specify override options available to an end user;

DESCRIPTION

The following description should be read with reference to the drawings, in which like elements in different drawings are numbered in like fashion. The drawings, which are not necessarily to scale, depict selected illustrative embodiments and are not intended to limit the scope of the invention. Although examples of construction, dimensions, and materials are illustrated for the various elements, those skilled in the art will recognize that many of the examples provided have suitable alternatives that may be utilized. Also, while methods of the present disclosure may be described primarily in relation to HVAC system operations to heat a space, it is contemplated that analogous considerations may apply to HVAC system operations for cooling, as well.

Figure 1:
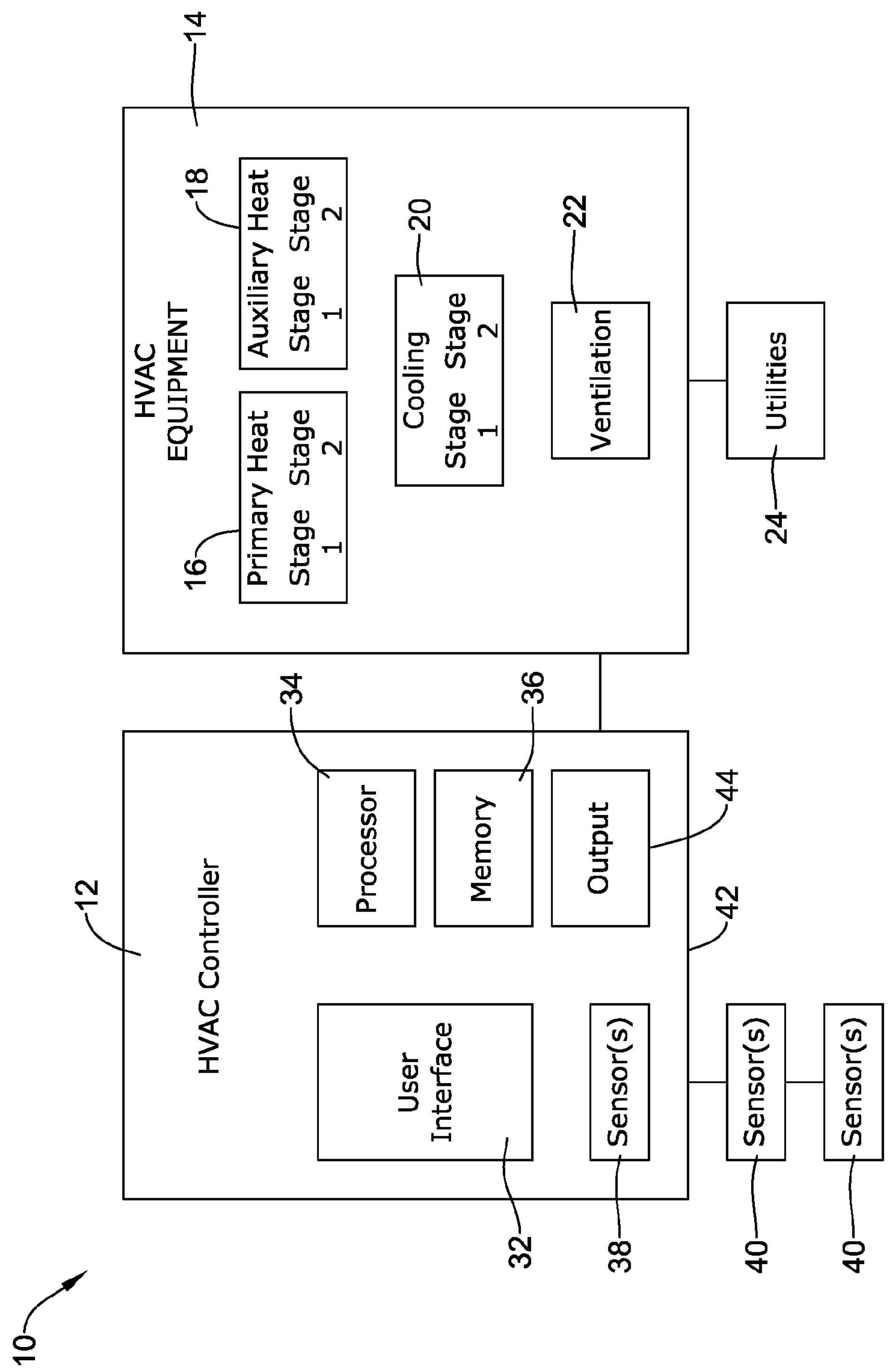
FIG. 1 is a schematic block diagram showing an illustrative HVAC system for conditioning the inside air of a building.

FIG. 1 is a schematic diagram showing an illustrative HVAC system 10 for conditioning the inside air of a building. The HVAC system 10 may include a heating system, a cooling system, a ventilation system, a humidification system and/or any other HVAC component or system, as desired. The methods and devices of the present disclosure may be practiced with HVAC system 10 and/or as part of HVAC system 10, but they are not limited to HVAC system 10 and may be practiced with other systems as well. While HVAC systems are used here as an example, it is contemplated that the methods disclosed herein may be applied to other devices, such as water heaters, for example.

The illustrative HVAC system 10 shown in FIG. 1 includes an HVAC controller 12, which may be or may include a thermostat in some instances. The HVAC controller may be configured to interact with and control HVAC equipment 14. HVAC controller 12 may be a local HVAC controller, located in the building that is conditioned by the HVAC equipment 14, or in close proximity to the building, such as within a complex of neighboring buildings.

HVAC equipment 14 may include, for example, primary heating equipment 16 and auxiliary heating equipment 18, each of which are indicated in FIG. 1 as having two or more stages, although this is merely exemplary. In some cases, stages 1, 2, etc. may represent multiple modes of operation of a single unit, for example, low- and high-output modes of a single heat pump. In some cases, multiple stages may be provided by more than one unit: for example, a single heat-pump may be activated for stage 1 heat, and a second heat pump may be brought online in addition to the first for stage 2 heat. Auxiliary heating equipment 18 may provide heat at a higher unit cost than primary heating equipment 16. In some cases, primary and auxiliary heat may be provided by separate units, and in some cases, primary and auxiliary heat may be provided in a single unit.

In one illustrative embodiment, a forced air system is configured with a primary stage of heat provided by a heat pump, and auxiliary heat provided by electrical resistive heaters. In another illustrative embodiment, a primary stage of hot water radiant heat is provided along with auxiliary heat from an electric forced air furnace or electric base board heaters. These embodiments are merely illustrative, and a wide variety of other configurations are contemplated.

HVAC equipment 14 may include cooling equipment 20, which may include more than one unit and/or more than one stage of cooling. HVAC equipment 14 may include ventilation equipment 22, which may be configured to work in concert with heating equipment 16, 18, and/or cooling equipment 20. For example, ventilation equipment 22 may provide different levels of air movement depending on the stage and/or type of heating or cooling.

HVAC equipment 14 may include other units such as a humidifier unit, a dehumidifier unit, a UV filter unit and/or any other suitable HVAC unit as desired. In some cases, cooling equipment 20 and heating equipment 16, 18 may, for example, be combined in a forced air system, perhaps including a heat pump system, particularly in residential and/or light commercial applications. In other cases, one or more of cooling equipment 20, heating equipment 16, 18 and/or ventilation equipment 22 may be distinct systems controlled, either directly or indirectly, by HVAC controller 12. In some instances, it is contemplated that HVAC controller 12 may represent two or more distinct controllers, each controlling different equipment within HVAC equipment 14, and/or different zones within a structure.

HVAC controller 12 may include any suitable components related to effecting control of the HVAC system 10. For example, HVAC controller 12 may include a user interface 32. The user interface 32 may include one or more displays and/or buttons that a user may interact with. In some instances, a touchscreen display may be provided. In the illustrative embodiment, HVAC controller 12 may include a processor 34, which may be a microprocessor and/or may be referred to as a controller, and a memory 36 which may be used to store any appropriate information such as HVAC control routines or code, historical performance data, HVAC system and/or HVAC controller parameters, one or more programmable schedules for changing HVAC system parameters over time, a utility pricing schedule that may include one or more enhanced pricing time periods, and so on. HVAC system parameters may include setpoints for heating, cooling, humidity, etc., modes for ventilation equipment, fan settings, and the like.

As shown, HVAC controller 12 may include one or more sensors, such as an internal sensor 38 located within a housing 42 of the HVAC controller 12, and/or external sensors 40, which may be located external to the controller housing 42. The external sensors 40 may be within the building and/or outside the building, as desired. Sensors 38, 40 may sense any relevant parameters, such as but not limited to temperature and humidity. HVAC controller 12 may include one or more outputs 44 configured to issue operation commands to HVAC equipment 14 including equipment 16, 18, 20, 22. It is contemplated that HVAC controller 10 may be configured to execute any method of the present disclosure.

In some instances, one or more utilities 24 may provide energy to the HVAC system 10, including HVAC equipment 14. The utility or utilities 24 may supply a source of energy such as electricity, natural gas, hot water, steam, and/or any other suitable sources of energy. In order to help reduce peak loads, utilities may employ variable pricing schemes. Any number of pricing (rate) schemes may be employed. For example, energy rates may be raised during an enhanced pricing time period during the day compared to at night, due to higher anticipated demand for industrial and commercial use and/or greater demand for cooling during daylight hours. Any appropriate number of rate changes may be made during a day, such as a mid-tier or mid-peak rate becoming effective at the start of the work day, then a higher-tier or higher-peak rate becoming effective for the greatest temperature period later in the day when air conditioning loads are usually highest, then returning to a non-peak rate after the work day ends. In some arrangements, enhanced pricing time periods may recur on a daily basis, or they may recur daily within a group of days such as weekdays, with different rate schedules being effective on other groups of days such as weekends. In some cases, enhanced pricing time periods of a utility may recur on a weekly basis.

It may be desirable to operate the HVAC system in an economy mode during higher priced periods, and in a comfort mode during lower priced periods. In some embodiments, the user can set or change the economy versus comfort mode of the HVAC system. In some instances, the user may allow the utility to set or change the economy versus comfort mode of the HVAC system.

In some illustrative embodiments, the HVAC controller 12 may maintain in its memory a schedule that may be used to control the HVAC system. The schedule may be similar to that shown and described below with respect to FIG. 2. The schedule may represent the normal programmable schedule of a programmable thermostat. The schedule may, for example, be a 7 day programmable schedule (where each of the seven days of the week can have a separate schedule), a 5-2 programmable schedule (where the five week days have a common schedule, and the two weekend days have a common schedule), or any other schedule. In some cases, the schedule may have a number of days and one or more time periods for each of at least some of the days. In some instances, the nominal schedule may include a "sleep," a "wake," a "leave," and a "return" time period for each of the days of a week. The schedule may have at least one setpoint associated with each of the one or more time periods. The schedule may be maintained in the local HVAC controller's memory, and typically may be modified by an end user. The schedule may be programmed using an interface such as one of those disclosed in U.S. Pat. No. 7,114,554, "CONTROLLER INTERFACE WITH MULTIPLE DAY PROGRAMMING," Bergman et al., which is hereby incorporated by reference in its entirety. This is just one example.

Figure 2:
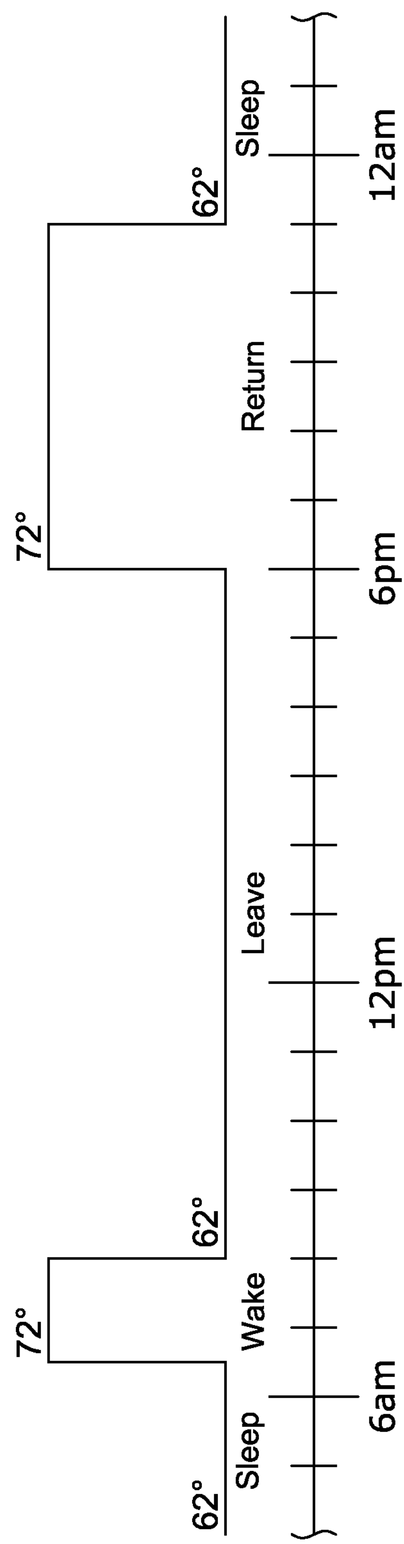
FIG. 2 is a time line illustrating an exemplary HVAC control schedule during a portion of one day.

FIG. 2 is a time line illustrating an exemplary schedule during a portion of one day. In the example shown, a "sleep" time period with a setpoint of 62° F. ends at 6:30 am and is followed immediately by a "wake" time period with a setpoint of 72° F. from 6:30 am to 8:00 am. A "leave" time period extends from 8:00 am to 6:00 pm, during which the setpoint is 62° F. A "return" time period commences at 6:00 pm, during which a 72° F. setpoint is in effect until the period ends coincident with the start of the next "sleep" time period. The lower setpoints of 62° F. in effect during the "sleep" and "leave" time periods may be considered to be energy efficient setpoints, as they generally may be maintained with less energy usage than higher setpoints during a heating season. Conversely, the setpoints of 72° F. in effect during the "wake" and "return" time periods may be considered to be less energy efficient setpoints, or comfort setpoints.

Because it is not physically possible to instantaneously transition to a comfort setpoint temperature from a prior more economical temperature, an HVAC controller may actuate one or more HVAC units such as a furnace or air conditioner in advance of a target time (e.g., in advance of the 6:30 am "wake" period in the schedule of FIG. 2) to reach the target temperature at about the target time (e.g., the comfort temperature of 72° F. at 6:30 am). This may be referred to as a programmed recovery condition, i.e., a recovery of temperature to achieve a programmed setpoint change. A condition having some similarities may arise when a user commands a manual setpoint change, for example, by raising a heating setpoint via the user interface of a thermostat. As in the case of a programmed recovery, instantaneous response to a manual setpoint change is not possible, and an HVAC controller may actuate one or more HVAC units in order to achieve the desired temperature change. However, there can be differences between programmed recovery and manual setpoint change conditions.

Programmed recovery and manual setpoint change conditions may differ with regard to what is considered acceptable and/or desirable performance in achieving the target temperature setpoint. For a programmed recovery, it may only matter that the target temperature be achieved at or about the target time. Given that the purpose of setting the temperature back is generally for reasons of economy, it may be desirable to achieve the programmed recovery in the most economical way possible. Thus, it may be desired to avoid the use of more expensive auxiliary stages in a programmed recovery, if possible. This may entail an earlier start to recovery with mainly or only the use of less expensive primary stages that may move the temperature at a slower rate, as compared to a recovery employing more expensive auxiliary stages that may move the temperature more quickly.

In the case of a manual setpoint change condition, however, a higher priority may be placed on the rate at which temperature change should be achieved. Often a manual setpoint change is entered by a user due to a desire for greater comfort. Such a desire may be gratified more quickly with the use of auxiliary stages capable of moving the temperature more rapidly than primary stages alone. However, the user may still have a desire to economize even in the context of a manual setpoint change, and thus may wish to avoid using auxiliary stages as long as the desired temperature change can be achieved in an acceptable amount of time. The HVAC controller 12 may provide ways to balancing these competing desires for comfort and economy.

Another condition of HVAC system operation exists that provides an opportunity for an HVAC controller to balance the competing desires for comfort and economy. In a steady state condition, an HVAC controller generally may attempt to maintain a setpoint temperature with only the use of primary stages. In the case of high heat loss (in the case of heating), primary heat stages may be unable to maintain the setpoint temperature, and auxiliary stages may be called. However, for purposes of economizing, a certain amount of deviation from the setpoint, beyond the nominal small variations around a setpoint normally associated with feedback control, may be allowed in order to avoid the use of the more expensive auxiliary heat.

The present disclosure describes devices and methods for control of HVAC systems that account for competing desires for comfort and economy. In some illustrative embodiments, control parameters may be modified by an installer and/or end user to allow customization for a particular installation and/or preference. While many examples and embodiments are described with regard to a heating system in a heating season, this should not be considered limiting, and corresponding examples and embodiments are contemplated for cooling in a cooling season. Furthermore, analogous examples and embodiments may be contemplated for other control scenarios, such as control of humidity, and control of various process parameters.

Methods and devices of the present disclosure may incorporate droop values, which are discussed in further detail elsewhere herein. Droop values may relate to deviations of actual measured temperatures from setpoints or other desired temperatures. “Droop” may be considered acceptable when accompanied by energy savings. Droop values may be used in some determinations of when to activate auxiliary stages to modify the temperature of an inside space. Such activations may be delayed compared with control of HVAC systems without the use of droop values. Droop values may be related to parameterizing allowable shortcomings in HVAC system performance, with regard to controlling to setpoints, with the potential benefit of lower and or less costly energy consumption. Droop values may relate to controlling HVAC equipment sub-optimally, from a comfort perspective, with the potential benefit of lower and or less costly energy consumption. Droop values may be associated with any or all stages of the HVAC system, or only some of the stages. In some illustrative embodiments, different droop values may be associated with a stage for different control conditions, such as the steady-state condition, the programmed recovery condition, and the manual setpoint change condition. The use of the same or different droop values for each of these control conditions is discussed herein. In some illustrative embodiments, a single droop value may be associated with multiple or all of the control conditions. In some illustrative embodiments, only auxiliary stages are controlled with reference to droop values, but in some other embodiments, non-auxiliary stages may be controlled with reference to droop values as well.

FIGS. 3-8 are schematic timelines that show illustrative uses of droop values in the control of an HVAC system. In FIGS. 3-8, time advances from left to right, and temperature increases in the upward direction. All the example situations illustrated in FIGS. 3-8 pertain to heating operation of an HVAC system, but it will be readily apparent to one of ordinary skill in the art that similar, analogous, and/or corresponding situations are contemplated for cooling operation.

Figure 3:
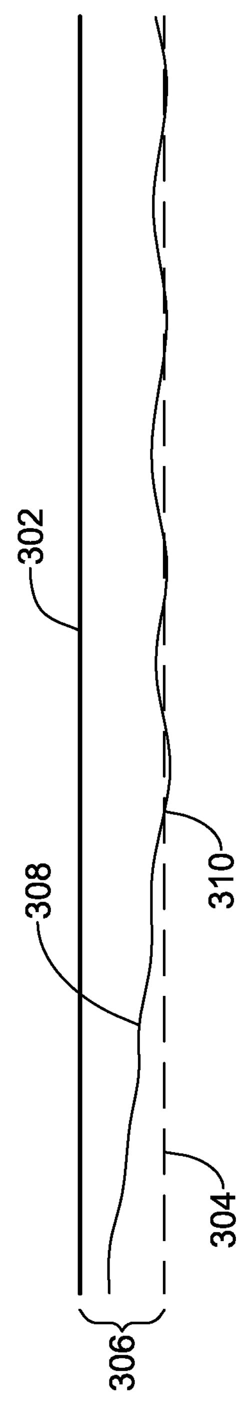
FIG. 3 is a schematic timeline illustrating an example of HVAC system control with use of a droop value in a steady state condition.

FIG. 3 illustrates an example of HVAC system control with use of a droop value in a steady state condition. Line 302 represents a steady state, or constant, setpoint temperature. Line 304 is displaced from line 302 by an amount or measure 306. Amount 306 may be related to an applicable droop value. The applicable droop value may be applicable in the sense that it may be a droop value corresponding to, in this example, an auxiliary stage during a condition of steady state temperature control. Furthermore, the applicable droop value may be applicable in that it may be a droop value that has not been overridden. Alternately, it may be an override droop value that is applicable because a selection has been made or a condition exists such that another droop value that might have been used in the present situation has been overridden. Whichever droop value is applicable in the scenario of FIG. 3, amount 306 may be related to that droop value in any suitable way. In some illustrative embodiments, the applicable droop value may be expressed in units of temperature (e.g., degrees), and the amount 306 may have the magnitude of the applicable droop value. In other illustrative embodiments, the applicable droop value may be expressed as a unit-less value, and the amount 306 may be obtained by multiplying the applicable droop value by a conversion factor. In some other illustrative embodiments, the applicable droop value may be expressed in qualitative terms, or even with arbitrary names or values, and a look up table, equation, or the like, may be employed to relate amount 306 to the applicable droop value. These examples are merely illustrative, and other relationships among droop values and amounts or measures such as amount 306 used for HVAC system control are contemplated.

Continuing with the example of FIG. 3, the HVAC controller may be programmed to attempt to control the temperature of the inside space with a primary stage or stages of HVAC equipment. Trace 308 represents the temperature of the inside space affected by the HVAC system. The temperature of trace 308 may be measured in any suitable way, such as with any of the sensors 38, 40 of HVAC controller 12. When the temperature of the inside space is successfully controlled with the primary stage(s), it may be that the temperature will vary about setpoint line 302 in a narrow range as the primary stage(s) are fired and rested by the HVAC controller. However, in FIG. 3, trace 308 is observed to increasingly deviate (decay) from the setpoint temperature of line 302 as time progresses forward from the start at the left side of FIG. 3. This may indicate that the HVAC system is unable to control the temperature of the inside space with only the output of the primary stage.

At 310, trace 308 crosses below line 304, meaning that the temperature of the inside space has deviated from the desired setpoint temperature by more than or equal to the amount 306 related to the applicable droop value. The HVAC controller may be programmed to activate an auxiliary stage when this condition is detected. In some illustrative embodiments, the HVAC controller may be programmed to activate the auxiliary stage to control the temperature of the inside space to a temperature offset by amount 306 from the setpoint temperature, that is, to control to the temperature represented by line 304. To the right of 310, trace 308 is shown as oscillating in proximity to line 304, suggesting that the auxiliary stage is being commanded to cycle in order to control to that temperature. In some illustrative embodiments, operation of the auxiliary stage may be managed, after activation, in a manner other than controlling to a drooped offset from a setpoint. For example, the auxiliary stage may be activated until the temperature reaches the desired setpoint temperature 302, after which it is disabled. In another example, the auxiliary stage may be activated for a fixed time interval, but this is merely exemplary. Any suitable control scheme may be used after the auxiliary stage is fired following the deviation of the temperature of the inside space relative to the desired setpoint temperature by more than or equal to an amount related to the applicable droop temperature.

Figure 4:
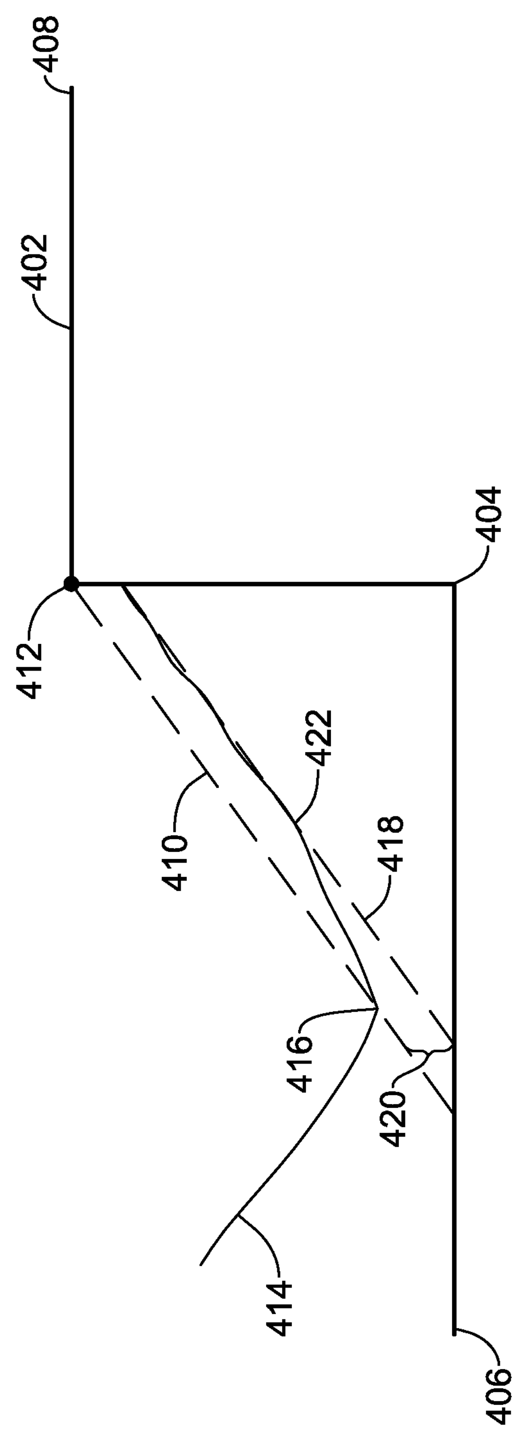
FIG. 4 is a schematic timeline illustrating an example of HVAC system control with use of a droop value in a programmed recovery condition.

FIG. 4 illustrates an example of HVAC system control with use of a droop value in a programmed recovery condition. Line 402 represents a desired setpoint temperature value that makes a programmed step change at time 404 from an energy efficient setpoint 406 to a comfort setpoint 408, as may occur, for example, with a programmable thermostat when transitioning from a sleep period to a wake period, or from an away period to a home period. Ramp 410 is a primary stage recovery ramp that leads to primary target 412, located at the target time (404) and the primary target temperature (i.e., comfort setpoint 408), which is the desired setpoint temperature after the step change.

Ramp 410 may represent an estimate of the temperature vs. time that a primary stage of an HVAC system such as system 10 of FIG. 1 may be able to achieve in attempting to recover from a lower temperature to the target temperature (i.e., comfort setpoint 408) by the target time at 412. While shown here as a straight line for ease of illustration, a recovery ramp may more generally take the form of a curve, and any suitable model may be used for estimating or projecting recovery ramps by methods and devices of the present disclosure. In some instances, the recovery ramp 410 may factor in historical HVAC system performance, measurements of current environmental conditions including inside and/or outside temperatures, measured and/or estimated heat loads in or on a space to be controlled, etc.

Continuing with the example of FIG. 4, trace 414 represents the temperature of the inside space affected by the HVAC system. Initially, trace 414 is observed to decay toward the energy-efficient setpoint 406 from a higher prior temperature as the inside space loses heat to the environment. When trace 414 intersects the primary stage recovery ramp 410 at 416, the HVAC controller may activate the primary stage to initiate recovery, and the temperature may progress upward generally toward the target 412. In some cases, the activation of the primary stage may merely slow the decrease in temperature, without actually reversing the trend. In some cases other than that illustrated in FIG. 4, the primary stage may be able to drive recovery of the temperature to the target without the auxiliary stage. In such a case, a trace representing the actual temperature of the inside space may follow the recovery ramp fairly closely. In other cases, the recovery with the primary stage may lag the ramp 410 (i.e., trace 414 may fall significantly below the recovery ramp). Such is the case in the example illustrated in FIG. 4.

Line 418 of FIG. 4 is placed such that at every point in time along its extent, it lies below the primary stage recovery ramp 410 by an amount 420 related to an applicable droop value, where applicable droop value is defined similarly as compared with the example of FIG. 3. In the example of FIG. 4, the applicable droop value may be a droop value corresponding to an auxiliary stage during the condition of programmed recovery, or any other applicable droop value. Amount 420 is related to an applicable droop value, and may be a fixed droop temperature.

When trace 414 intersects and drops below line 418 at 422, the temperature of the inside space has deviated from the desired setpoint temperature (represented by the instantaneous value of the primary stage recovery ramp 410) by more than or equal to the amount 420 related to the applicable droop value. The HVAC controller may be programmed to activate an auxiliary stage when this condition is met. In some illustrative embodiments, after the first time the temperature drops below line 418, the HVAC controller may be programmed to deactivate and activate the auxiliary stage as the instantaneous temperature rises above and drops below, respectively, line 418 (i.e., the temperature of the inside space ceases and resumes deviating from the desired setpoint temperature [the instantaneous value of the primary stage recovery ramp 410] by more than or equal to the amount 420). With such a control method, the trace 414 may oscillate about line 418 as recovery progresses toward time 404. In some other illustrative embodiments, other control methods for the period after the first activation of the auxiliary stage at 422 are contemplated. For example, the auxiliary stage may be activated until the temperature rises above the primary stage recovery ramp 410, or it may be activated until the comfort setpoint 408 is reached.

Upon reaching time 404, the HVAC controller may be programmed to practice any suitable control method. The controller may, for example, transition to a steady state control condition, such as that discussed in connection with FIG. 3. In some illustrative embodiments, the HVAC controller may continue to activate the auxiliary stage after time 404 until the comfort setpoint 408 is achieved, before transitioning to steady state control condition, or any other suitable control condition.

Figure 5:
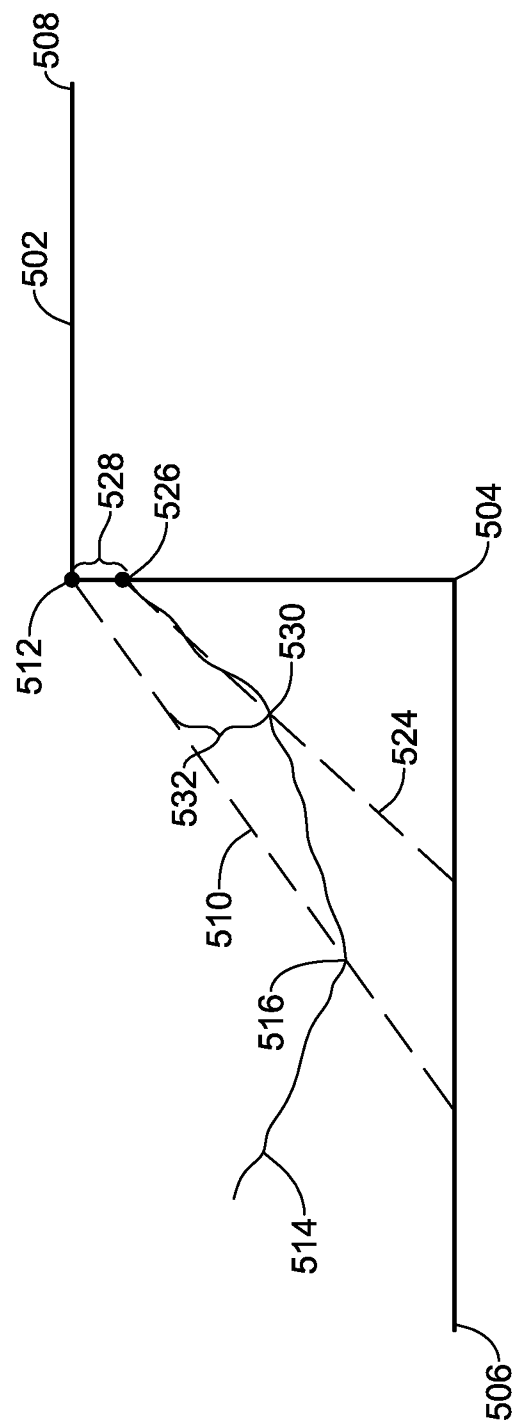
FIG. 5 is a schematic timeline illustrating another example of HVAC system control with use of a droop value in a programmed recovery condition.

FIG. 5 illustrates another example of HVAC system control with use of a droop value in a programmed recovery condition. Line 502 represents a desired setpoint temperature value that makes a programmed step change at time 504 from an energy efficient setpoint 506 to a comfort setpoint 508. Ramp 510 is a primary stage recovery ramp that leads to primary target 512, located at the target time (504) and the primary target temperature (i.e., comfort setpoint 508). Similarly as with ramp 410 of FIG. 4, primary stage recovery ramp 510 and other recovery ramps of the present disclosure may take any suitable form and may be estimated or projected in any suitable way.

Trace 514 represents the temperature of the inside space affected by the HVAC system. When trace 514 intersects the primary stage recovery ramp 510 at 516, the HVAC controller may activate the primary stage to initiate recovery. Similarly again with respect to the example of FIG. 4, in the example of FIG. 5, the primary stage is unable to drive the temperature (trace 514) along the primary stage recovery ramp 510 toward the target 512.

Ramp 524 is an auxiliary stage recovery ramp that leads to auxiliary target 526, located at the target time (504) and an auxiliary target temperature. The auxiliary target temperature may be offset from the primary target temperature by a target offset amount 528 related to the applicable droop value in any suitable way. As the HVAC system generally may be able to move the inside temperature more rapidly with the auxiliary stage activated, the slope of the auxiliary stage recovery ramp 524 generally may have a steeper slope than the primary stage recover ramp 510. Similarly as with other recovery ramps described in the present disclosure, ramp 524 may be take any suitable form and be determined in any suitable way. Auxiliary target 526 may be offset or "drooped" from primary target 512 by target offset amount 528 to result in delayed activation of the auxiliary stage, relative to the case where the auxiliary target is co-located with the primary target (i.e., not drooped). Delayed activation of the auxiliary stage may be desired for energy savings.

When trace 514 intersects and drops below the auxiliary stage recovery ramp 524 at 530, the temperature of the inside space has deviated from the desired setpoint temperature value (represented by the instantaneous value of the primary stage recovery ramp 510) by more than or equal to an amount 532 related to the applicable droop value. In this example, the amount 532 related to the applicable droop value is the difference between the desired setpoint temperature value and the auxiliary stage recovery ramp temperature at that instant. The HVAC controller may be programmed to activate an auxiliary stage when this condition is met. In some illustrative embodiments, after the first time the temperature drops below the auxiliary stage recovery ramp 524, the HVAC controller may be programmed to deactivate and activate the auxiliary stage as the instantaneous temperature rises above and drops below, respectively, the auxiliary stage recovery ramp. With such a control method, the trace 514 may oscillate about the auxiliary stage recovery ramp 524 as recovery progresses toward time 504. In some other illustrative embodiments, other control methods for the period after the first activation of the auxiliary stage at 530 are contemplated. For example, the auxiliary stage may be activated until the temperature rises above the primary stage recovery ramp 510, or it may be activated until the auxiliary target temperature is reached, or until the comfort setpoint 508 is reached.

As with the example of FIG. 4, in the example of FIG. 5, upon reaching time 504, the HVAC controller may be programmed to practice any suitable control method. The controller may, for example, transition to a steady state control condition, such as that discussed in connection with FIG. 3. In some illustrative embodiments, the HVAC controller may continue to activate the auxiliary stage after time 504 until the comfort setpoint 508 is achieved, before transitioning to steady state control condition, or any other suitable control condition.

Figure 6:
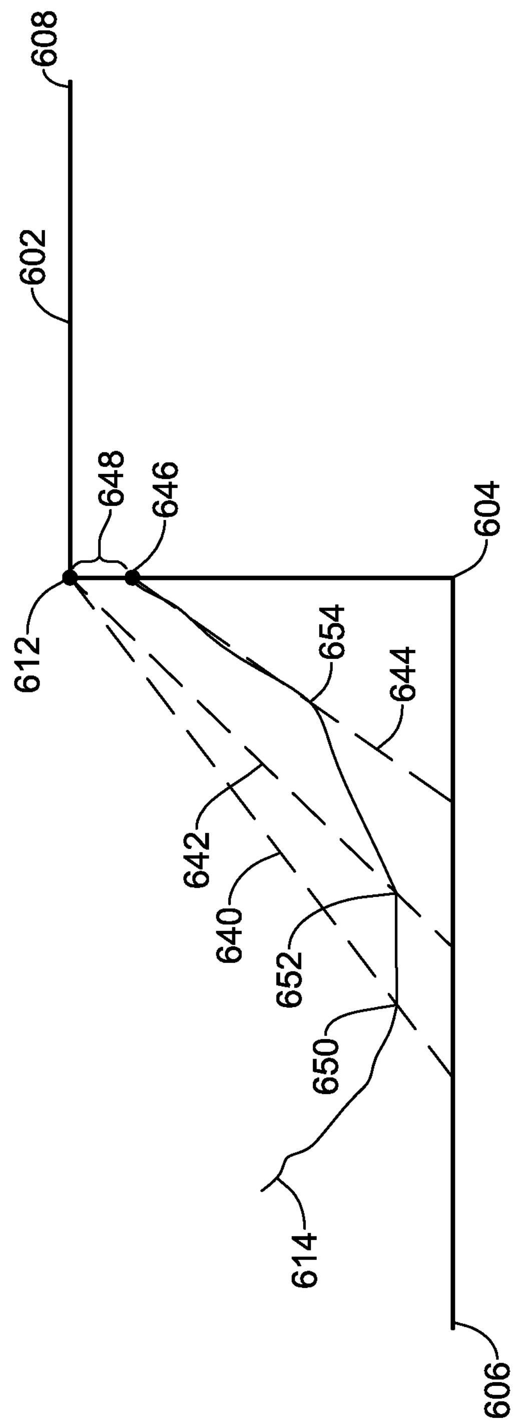
FIG. 6 is a schematic timeline illustrating yet another example of HVAC system control with use of a droop value in a programmed recovery condition.

FIG. 6 illustrates another example of HVAC system control with use of a droop value in a programmed recovery condition. Line 602 represents a desired setpoint temperature value that makes a programmed step change at time 604 from an energy efficient setpoint 606 to a comfort setpoint 608. Ramp 640 is a primary stage 1 recovery ramp that leads to primary target 612, located at the target time (604) and the primary target temperature (i.e., comfort setpoint 608). Ramp 642 is a primary stage 2 recovery ramp that leads to the same primary target 612. Primary stage 1 recovery ramp 640 and primary stage 2 recovery ramp 642 may be associated with, for example, first and second stages of a heat pump that have similar efficiencies, but different heat outputs. Because they have similar efficiencies, the decision of whether and when to activate the second stage of the heat pump associated with primary stage 2 recovery ramp 642 may be based upon whether the output of the first stage of the heat pump is capable of making adequate progress toward the primary target 612, rather than being based upon the cost of energy. In another example, a primary stage 2 recovery ramp may lead to a target other than the primary target.

Ramp 644 is an auxiliary stage recovery ramp that leads to auxiliary target 646, located at the target time (604) and an auxiliary target temperature. The auxiliary target temperature may be offset from the primary target temperature by a target offset amount 648 related to an applicable droop value in any suitable way.

Trace 614 represents the temperature of the inside space affected by the HVAC system. When trace 614 intersects each of the primary stage 1 recovery ramp 640 at 650, the primary stage 2 recovery ramp 642 at 652, and the auxiliary recovery ramp 644 at 654, the HVAC controller may activate the corresponding stage. As with the examples of FIGS. 4 and 5, in the example of FIG. 6, upon reaching time 604, the HVAC controller may be programmed to practice any suitable control method.

Figure 7:
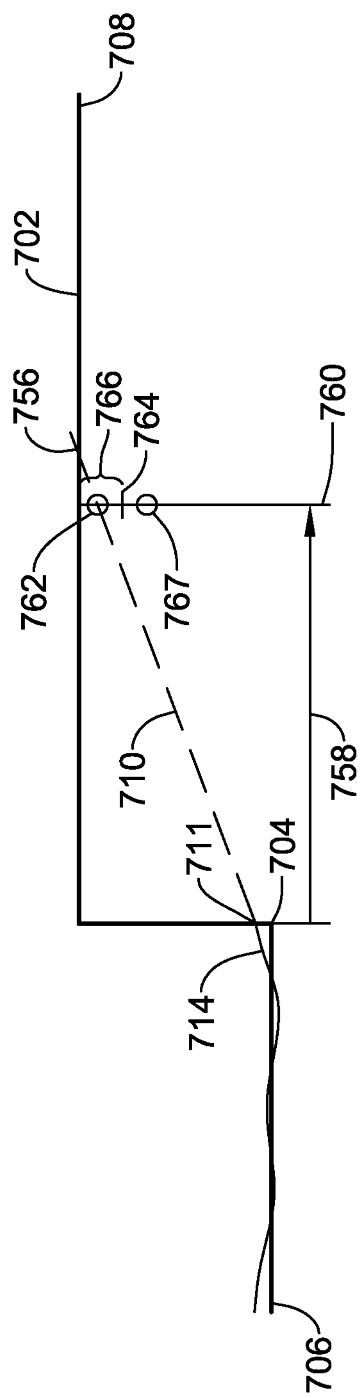
FIG. 7 is a schematic timeline illustrating an example of HVAC system control with use of a droop value in a manual setpoint change condition.

FIG. 7 illustrates an example of HVAC system control with use of a droop value in a manual setpoint change condition. As noted elsewhere herein, manual setpoint change conditions may be similar to programmed recovery conditions in some aspects, and may differ considerably in other aspects. Line 702 represents a desired setpoint temperature value that makes a step change at time 704 when a manual setpoint change is entered, for example, through a user interface of an HVAC controller/thermostat such as user interface 32 of HVAC controller 12 of FIG. 1. At time 704, the setpoint changes from more efficient setpoint temperature 706 to a manually changed setpoint temperature 708. At time 704, one or more primary stages may be activated to begin moving the temperature toward the manually changed setpoint temperature 708.

At or about time 704, the processor or controller of the HVAC controller may determine a primary stage recovery ramp 710. Ramp 710 may take any suitable form and may be estimated or projected in any suitable way. Ramp 710 may represent an estimate of temperatures that may be expected vs. time as a result of the activation of the one or more primary stages. In contrast to the programmed recovery ramps of FIGS. 4-6, which may be projected back in time from a target, primary stage recovery ramp 710 may projected forward from the actual temperature 711 (as found on trace 714 representing the temperature of the inside space) at time 704 when the manual setpoint change is initiated.

Ramp 710 may be used in any suitable manner for any suitable purpose. It may be used to estimate when the manually changed setpoint temperature 708 may be achieved under the influence of the primary stage(s); this is projected to occur at 756. It may be used to predict the temperature that may be achieved under the influence of the primary stage(s) at one or more particular times, and an assessment may be made as to whether the predicted temperature represents acceptable progress toward achieving the manually changed setpoint temperature 708.

In some illustrative embodiments, a time interval 758 may be considered an appropriate or acceptable amount of time after a manual setpoint change is entered with regard to assessing progress toward the new setpoint. In FIG. 7, this interval expires at target time 760. In some illustrative embodiments, time interval 758 may have a fixed value, such as 10, 15, 17, 20, 25, or 30 minutes, or any other suitable value, including values between those listed here. In some illustrative embodiments, time interval 758 may be variable, depending on any suitable considerations. For example, it may be longer for manual setpoint changes of greater magnitude than for those of smaller magnitude. It may factor in the current control mode (e.g., "wake," "leave," etc.), if applicable. In some illustrative embodiments, the magnitude of time interval 758, whether fixed or variable, may be depend on parameters entered by an installer or an end user through a user interface of the HVAC controller/thermostat.

At target time 760, which occurs time interval 758 after the manual setpoint change at time 704, the primary stage recovery ramp 710 predicts that the temperature will be predicted temperature 762. In FIG. 7, predicted temperature 762 falls short of manually changed setpoint temperature 708. In view of the desire to economize, this may be considered acceptable. An offset manual setpoint change target is indicated at 764. Offset manual setpoint change target 764 is offset from the manually changed setpoint temperature 708 by a target offset amount 766 related to an applicable droop value in any suitable way. In some illustrative embodiments, the applicable droop value is expressed in degrees, and the target offset amount 766 has the value of the applicable droop value. In some illustrative embodiments, because the predicted temperature 762 falls within the target offset amount 766 of the manually changed setpoint temperature 708 (that is, it falls above offset manual setpoint change target 764 in the example of FIG. 7), the predicted performance of the primary stage(s) in achieving the manually changed setpoint temperature may be considered adequate. Accordingly, the use of the auxiliary stage(s) maybe avoided in such a scenario. In some illustrative embodiments, the auxiliary stages may be locked out and prevented from activating during recovery to the manually changed setpoint temperature 708 when predicted performance of the primary stage(s) in achieving the manually changed setpoint temperature is considered adequate. In some illustrative embodiments, if predicted temperature 762 falls outside the target offset amount 766 relative to the manually changed setpoint temperature 708 (that is, it falls below offset manual setpoint change target 764 in the example of FIG. 7, such as at 767), one or more auxiliary stages may be activated in the recovery to the manually changed setpoint temperature 708. Any suitable method may be used to determine how and/or when to activate auxiliary stages in such a recovery.

Determinations of whether predicted temperature 762 fall within target offset amount 766 of manually changed setpoint temperature 708 may be performed at any suitable time. In some embodiments, a determination is made at or about the time 704 of the manual setpoint change. In some embodiments, a determination may be performed at time substantially after the time 704 of the manual setpoint change. In some embodiments, determinations may be performed multiple times, or even essentially continuously, during the recovery to the manually changed setpoint temperature 708.

Figure 8:
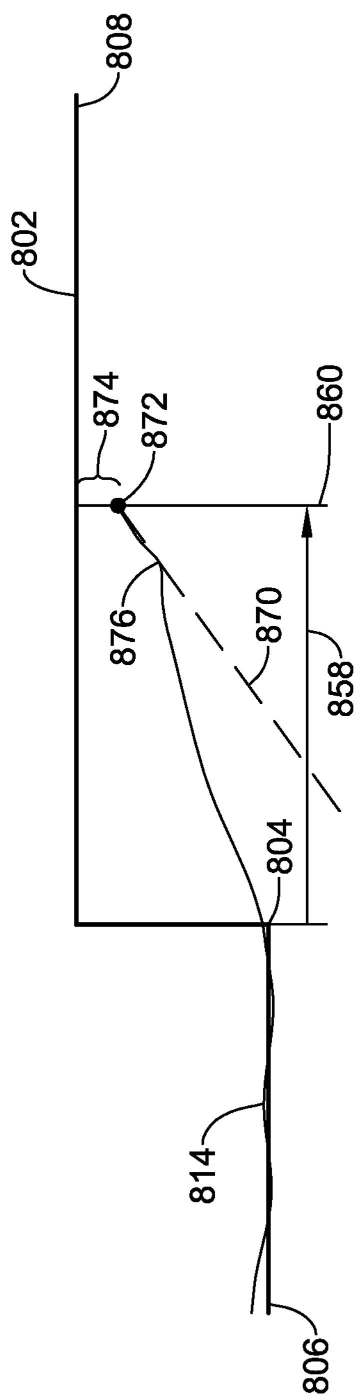
FIG. 8 is a schematic timeline illustrating another example of HVAC system control with use of a droop value in a manual setpoint change condition.

FIG. 8 illustrates another example of HVAC system control with use of a droop value in a manual setpoint change condition. Line 802 represents a desired setpoint temperature value that makes a step change at time 804 when a manual setpoint change is entered, for example, through a user interface of an HVAC controller/thermostat such as user interface 32 of HVAC controller 12 of FIG. 1. At time 804, the setpoint changes from more efficient setpoint temperature 806 to a manually changed setpoint temperature 808. At time 804, one or more primary stages may be activated to begin moving the temperature toward the manually changed setpoint temperature 808.

Similarly as in the example of FIG. 7, in the example of FIG. 8, a time interval 858 may be considered an appropriate or acceptable amount of time after a manual setpoint change is entered with regard to assessing progress toward the new setpoint. Time interval 858 may be determined in any suitable way. In FIG. 8, this interval expires at target time 860. When, or at any suitable time after, the manually changed setpoint temperature 808 is entered, the processor or controller of the HVAC controller may determine an auxiliary stage recovery ramp 870, estimated or projected backward from auxiliary target 872. Ramp 870 may take any suitable form and may be estimated or projected in any suitable way. Auxiliary target 872 may be located at target time 860 and be offset or drooped from manually changed setpoint temperature 808 by target offset amount 874 to result in delayed activation of the auxiliary stage, relative to the case where the auxiliary target is at the manually changed setpoint temperature 808 (i.e., not drooped). Target offset amount 874 may be related to an applicable droop value in any suitable way.

Trace 814 represents the temperature of the inside space affected by the HVAC system. In the example of FIG. 8, prior to time 804, trace 814 oscillates about more efficient setpoint temperature 806 as the HVAC system controls the temperature in a steady state condition. When the manual setpoint change is entered at 804, the primary stage activates and trace 814 rises, although in this example apparently not steeply enough to achieve either manually changed setpoint temperature 808 nor the drooped auxiliary target temperature by target time 860. When trace 814 intersects auxiliary recovery ramp 870 at 876, the auxiliary stage(s) may be activated to more rapidly modify the temperature. From 876 to target time 860, trace 814 is shown as oscillating about the auxiliary recovery ramp 870 as the HVAC controller controls the HVAC system in order to drive the temperature toward the auxiliary target temperature at 872 and/or the manually changed setpoint temperature 808. Any suitable control method for the auxiliary stage may be used after it is fired at 876. After target time 860, any suitable control method for the HVAC system may be used.

Figure 9:
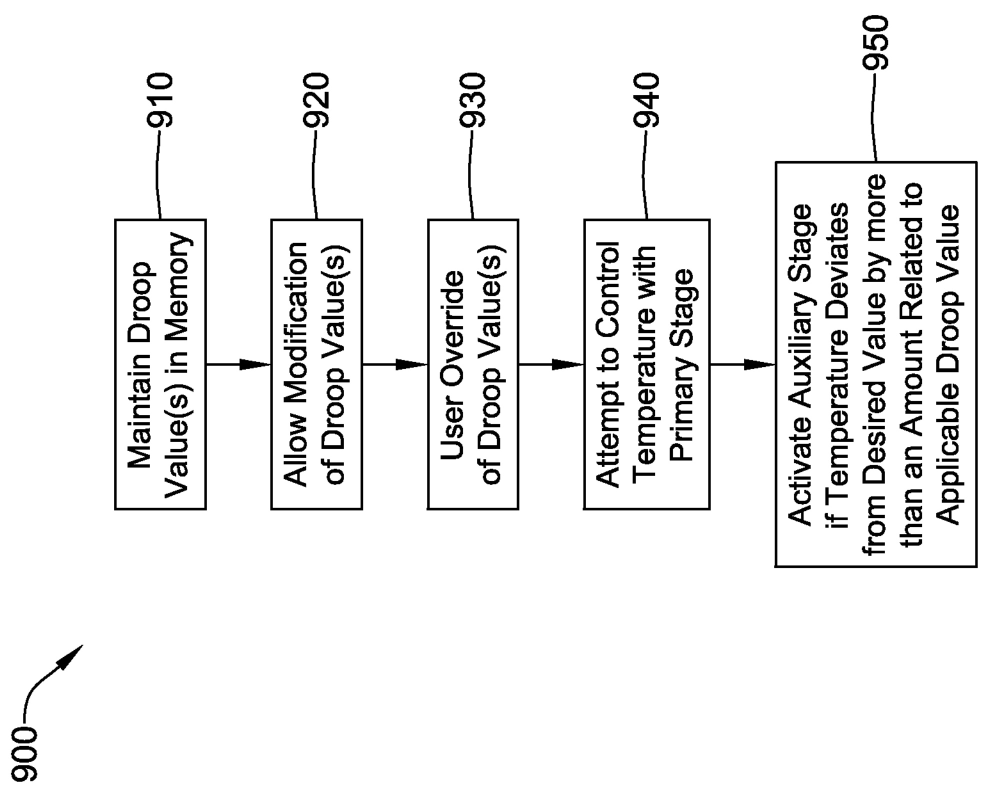
FIG. 9 is a flowchart of an illustrative method for operating an HVAC system, including the use of droop values.

All the scenarios illustrated in FIGS. 3-8 may involve the use of droop temperatures in various HVAC control conditions. FIG. 9 is a flowchart of an illustrative method for operating an HVAC system, such as the HVAC system 10 of FIG. 1 or any other suitable HVAC system, including the use of droop values. The HVAC system may have one or more HVAC units with at least a primary stage and an auxiliary stage for modifying a temperature of an inside space. The HVAC system may have an HVAC controller, such as controller 12 of FIG. 1 or any other suitable controller, for controlling the one or more HVAC units, and the method of the embodiment under discussion may be performed by or with the controller. The HVAC controller may be configured to control the HVAC units in accordance with a programmable schedule (such as the schedule illustrated in part in FIG. 2 and described herein) under one or more of at least three conditions including a steady state condition, a programmed recovery condition, and a manual setpoint change condition. FIG. 9 is a flow chart showing some illustrative steps of the illustrative method 900.

At step 910 of illustrative method 900, one or more droop values are maintained in the memory of the HVAC controller. Any suitable set of droop values may be defined and maintained. In some illustrative embodiments, individual droop values may be defined and maintained for any combination or sub-combination of stage, operating condition (e.g., steady state, programmed recovery, manual setpoint change, and/or any other suitable condition), and control mode (such as standard, economy, comfort, etc., as discussed further herein). Droop values may be further distinguished by variables such as season, types or identities of occupants of the inside space, and any other suitable variables. In some illustrative embodiments, a single droop value may be associated with and/or used for multiple stages, conditions, and/or modes, etc. For example, in an illustrative embodiment, a single droop value may be used for the steady state condition, the programmed recovery condition, and the manual setpoint change condition, for an auxiliary stage.

At step 920 of illustrative method 900, modification of the droop values maintained in step 910 may be allowed. Such modification may be performed via the user interface of the HVAC controller, such as user interface 32 of HVAC controller 12. In some illustrative embodiments, modification of droop values may be performed via the user interface in an installer setup routine. In some illustrative embodiments, modification of droop values may be performed via the user interface by an end user of the HVAC system. The modification of droop values of step 920 may be performed in any suitable manner, and may take any suitable form. For example, values of droop values may be modified individually, or in any suitable sets of droop values. Relative modification (e.g., increase droop value by +2 units) or absolute modification (e.g., set droop value to 3) may be performed. Modification of droop values may take forms other than changes in values. For example, droop values or set of droop values may be deactivated or activated. In one example, a single value may be designated as being used for multiple droop values corresponding to varying stages/conditions/modes/etc., thereby deactivating or making dormant individual droop values previously associated with those stages/conditions/modes/etc. In another example, where previously a single value was used for multiple droop values, the single value may be deactivated, and previously dormant individual droop values made active. These are merely exemplary and non-limiting, to indicate in part the range of modification of droop values that may be performed in step 920.

Droop values maintained in step 910 and possibly modified in step 920 may be referred to as nominal or installer droop values. They may be considered nominal droop values in the sense that they may be intended for use in controlling the HVAC system in the absence of any override of their use. They may be considered installer droop values in that they may be droop values established at the time of HVAC controller and/or system installation, possibly modified by an installer, and possibly subject to subsequent override, by an HVAC system user and/or any other override scenario.

Figure 10:
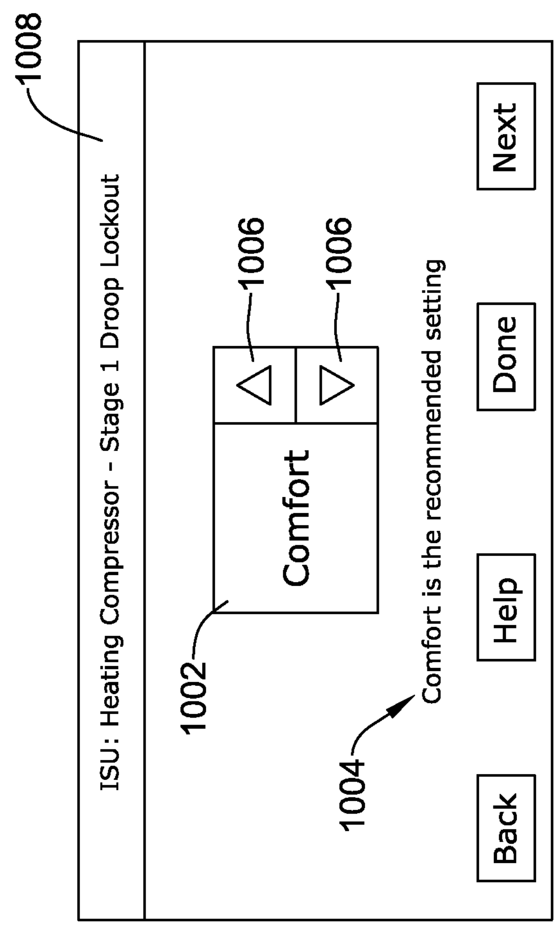
FIG. 10 is a schematic illustration of a touch screen displaying user interface elements for an installer set up of a droop value.
Figure 11:
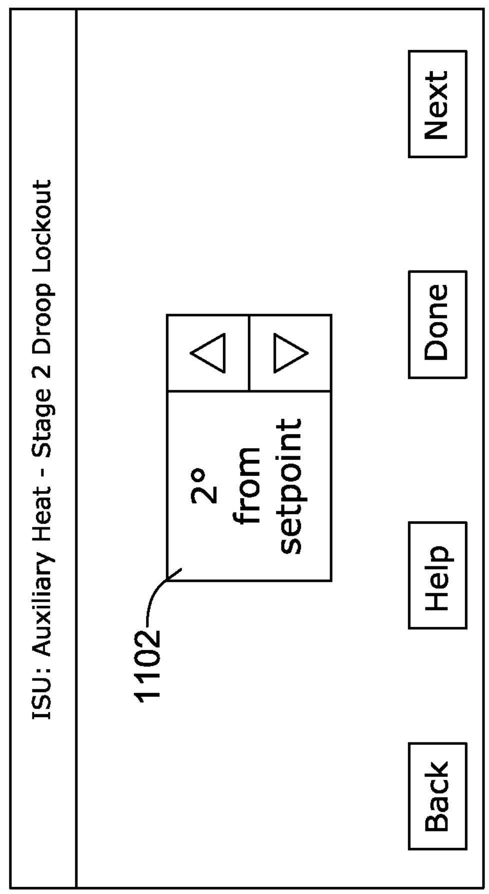
FIG. 11 is a schematic illustration of another touch screen displaying user interface elements for an installer set up of a droop value.

FIGS. 10 and 11 show illustrative user interface elements of an HVAC controller that may be used to modify droop values, as in step 920 of method 900. FIG. 10 shows an illustrative touch screen displaying user interface elements for an installer set up of a droop value for a stage 1 heat pump stage. The current value of the droop value may be shown in area 1002. In this example, “Comfort” is displayed. “Comfort” may refer to a droop value of zero corresponding to no droop. The user interface may present context-sensitive help information for the installer/user to assist them in the set up/modification process, as at 1004. Buttons 1006 may be used to modify the droop value displayed in area 1002. Title bar 1008 may indicate the droop value being modified. In some illustrative examples, title bar 1008 may indicate a control condition (e.g., steady state, programmed recovery, manual setpoint change) to which the presently-modifiable droop value pertains, or any other applicable identifying information.

Similarly to FIG. 10, FIG. 11 shows an illustrative touch screen displaying user interface elements for an installer set up of a droop value for a stage 2 auxiliary heat stage. The information in area 1102 indicates a droop value for the stage of 2 degrees. The examples of FIGS. 10 and 11 are merely illustrative, and many other examples of user interface elements are contemplated.

Returning to method 900 of FIG. 9, at step 930, a user who may be an end user, may selectively override one or more droop values, which may be nominal or installer droop values, via the user interface of the HVAC controller. While the HVAC controller may be configured to allow a user to override droop values via the user interface, in some illustrative examples, this capability may be disabled, for example, by selection of an installer during set up of the HVAC controller and/or system. Selective override of droop values may take any of a number of forms, and is discussed further herein.

At step 940 of method 900, the HVAC controller may attempt to control the temperature of the inside space with one or more primary stages of HVAC equipment, as discussed, for example, in the examples of FIGS. 3-8. In some cases, it may be possible to control the temperature without activation of any auxiliary stages.

At step 950 of method 900, the HVAC may activate one or more auxiliary stages of HVAC equipment if the temperature of the inside space deviates from a desired value, such as a desired setpoint temperature, by more than or equal to an amount or measure that is related to an applicable droop value. This may occur in any of a steady state condition, a programmed recovery condition, and/or a manual setpoint change condition. FIGS. 3-8 and the corresponding descriptions provide non-limiting illustrative examples of scenarios in which an HVAC controller may activate auxiliary stages in accordance with step 950. In some illustrative examples, HVAC equipment may be activated when an actual instantaneous temperature deviates from a desired value and/or setpoint by more than or equal to an amount or measure that is related to an applicable droop value. In some illustrative examples, HVAC equipment may be activated when a temperature is predicted to deviate from a desired value and/or setpoint by more than or equal to an amount or measure that is related to an applicable droop value, such as in the example of FIG. 7. Such a prediction may be explicit, as in the example of FIG. 7, or implicit, as in the example of FIG. 8, where the fact that the temperature trace 814 meets the auxiliary stage recovery ramp 870 may be considered an implicit prediction that, without activation of the auxiliary stage, the temperature of the inside space would deviate from the manually changed setpoint temperature 808 by more than or equal to target offset amount 874 at time 860.

Selective override of droop values, as in step 930 of method 900, may take any of a number of forms. A user may select override with a comfort control setting or option for any of the steady state condition, the programmed recovery condition, and the manual setpoint change condition. Without override, the applicable droop value for one of these control conditions may be an installer or nominal droop value. With selection of comfort control override, the applicable installer droop value may be overridden by a reduced droop value. For example, if the installer droop value is expressed in degrees and has a value of 2 degrees, it may be overridden with a value of 1 degree, 0 degrees, or any other value between 2 degrees and 0 degrees. A result of overriding with a reduced droop value is that an auxiliary stage may be activated sooner than it would have been with a nominal or installer droop value, possibly resulting in more rapidly achieving control of the inside temperature closer to the desired setpoint.

Another form of override is selecting an economy control setting or option for any of the steady state condition, the programmed recovery condition, and the manual setpoint change condition. With selection of economy control override, the applicable installer droop value may be overridden by an increased droop value. For example, an installer droop value with a value of 2 degrees may be overridden with a value of 3 degrees or any other value greater than 2 degrees. A result of overriding with an increased droop value is that an auxiliary stage may be activated later than it would have been with a nominal or installer droop value, or not at all. This may result in energy savings, at the possible expense of tardy achievement of desired setpoints, or possibly not succeeding in controlling the inside temperature to a desired setpoint at all.

Along with allowing a user to selectively override droop values with comfort and/or economy control settings/options in one or more control conditions, an HVAC controller may provide through its user interface the option for a user to select a standard control setting or option, in which the installer or nominal droop values are not overridden.

FIG. 12 shows an illustrative touch screen displaying user interface elements for allowing an installer to specify override options that an end user (e.g., homeowner) may have the option of selecting from. Button 1202 allows the installer to specify that only Standard control may be used for auxiliary heat, which consequently has the effect of disabling droop value override by the end user. Button 1204 allows the installer to specify that the end user may select between Standard and Economy control, and thus, the end user will have the option of selecting the economy control setting or option for overriding the installer or nominal droop value(s). FIG. 12 is merely illustrative, and many other examples of user interface elements are contemplated. For example, buttons or any other suitable user interface elements may allow an installer to allow the end user to choose between Standard and Comfort control, or between Comfort and Economy control, or between Comfort, Standard, and Economy control. In some illustrative embodiments, an installer may be provided further choices for customizing the end users' options, such as allowing different choices of control modes for different stages. For example, an HVAC controller may be configured to control more than one stage of auxiliary heat, and the installer may be able to specify that an end user may choose between standard and economy control for a first stage of auxiliary heat, but the end user may not override standard control for the second stage of auxiliary heat.

Figure 13:
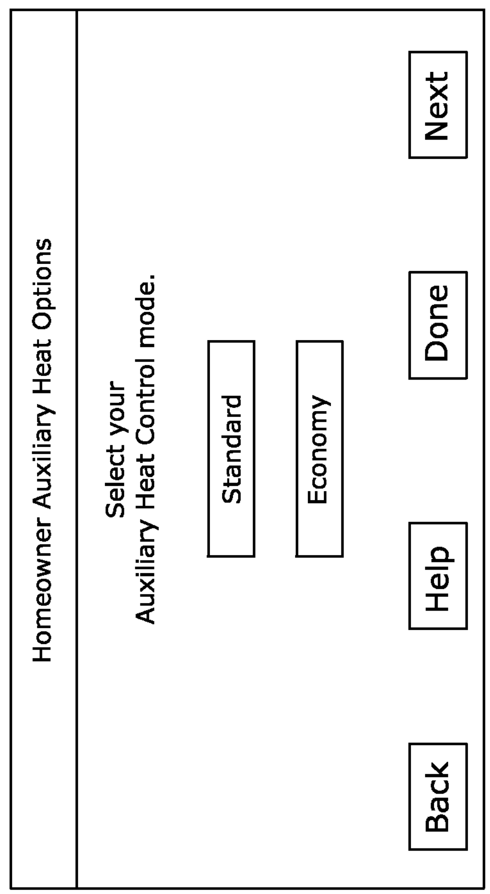
FIG. 13 is a schematic illustration of a touch screen displaying user interface elements for allowing an end user to select an auxiliary heat control mode.

FIG. 13 shows an illustrative touch screen displaying user interface elements for allowing an end user (homeowner) to select an auxiliary heat control mode: either Standard control, or Economy control. Any suitable user interface elements may be used for such selections. The illustration of Standard and Economy control options is merely exemplary; similar or other suitable user interface elements may be used to select between, for example, Standard and Comfort control, or between Comfort and Economy control, or between Comfort, Standard, and Economy control.

Figure 14:
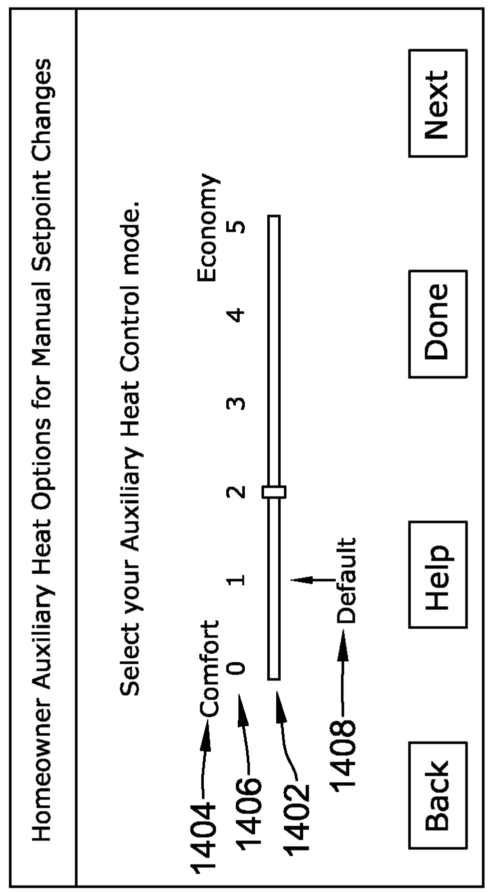
FIG. 14 is a schematic illustration of a touch screen displaying user interface elements for allowing an end user to select an auxiliary heat control mode and/or modify an override droop value or parameter.

FIG. 14 shows an illustrative touch screen displaying user interface elements that allow an end user (homeowner) to select an auxiliary heat control mode, and/or modify an override droop value or parameter, for (in this example) the manual setpoint change condition. Similar user interface elements may be provided for any other stage, control condition, etc. Compared with FIG. 13, which permits a binary choice between Standard and Economy, the slider 1402 allows the end user to select an override droop value or parameter from a plurality of values. The slider 1402 may be configured to allow selection of discrete droop values (the slider may "snap" to certain predefined values, for example), or it may be configured to allow selection from a virtually continuous range of values. Qualitative (1404) and/or quantitative (1406) droop value scales may be provided. Indicia such as "Default" marker 1408 may be provided to provide further context to the scale. Default marker 1408 may be provided at the nominal (default) or installer droop value. If the slider is positioned at the Default marker, it may be considered that Standard control has been specified, and no override droop value indicated. If the slider is positioned other than at the Default marker, it may be considered that an override droop value has been selected/indicated. FIG. 14 is merely exemplary, and any suitable user interface elements allowing discrete and/or continuous, and qualitative and/or quantitative selection of (override) droop values may be used. In some illustrative examples, a slider interface such as that illustrated in FIG. 14 may be provided, but the slider range may only permit selection of droop values corresponding to Standard ranging to Economy control. In such a case, low droop values such as "Comfort" or "0" may not be provided on the slider scale, or they may be dimmed-out and the slider not permitted to select them.

While quantitative droop value scale 1406 (0, 1, . . . , 5) may suggest a linear progression of droop values, in some illustrative embodiments this may or may not be the case. In some illustrative embodiments, scale 1406 may suggest a monotonic and/or proportional, but not linear droop value scale. In some illustrative embodiments, control mode selections made via a user interface such as that of FIG. 14 may serve to select droop values via a lookup table, and hence the labels of scales 1406 and/or 1404 may be essentially arbitrary.

In some illustrative embodiments, an HVAC controller user interface may be configured to allow a user to select an override droop parameter for at least one of the steady state condition, the programmed recovery condition, and the manual setpoint change condition, and associated with one or more control settings/options such as an economy, standard and/or comfort settings. The override droop parameter selected may be maintained in memory, and when the corresponding control option (e.g., economy, standard, comfort) is selected and the corresponding condition(s) is active, the controller may be programmed to override at least one of the one or more droop values with a value that is dependent upon the selected economy override droop parameter. Such an approach may regarded as combining a binary or either/or type scheme such as that illustrated in FIG. 13 with a variable droop value scheme such as that of the user interface elements of FIG. 14, by allowing a user to pre-select a specific droop value parameter, then later make a selection of whether to use the specific droop parameter selected.

Droop values may be established by any suitable methods and/or mechanisms, in addition to and/or as an alternative to other methods and/or mechanisms disclosed herein. In some illustrative embodiments, default, nominal, or installer droop values may be programmed into an HVAC controller at the time of manufacture. In some illustrative embodiments, droop values may be entered into an HVAC controller via a communication link (e.g., wireless, wired, optical, etc.) in a manual, automated, or semi-automated procedure. In some illustrative embodiments, droop values, once established or entered, may be modified by any suitable method and/or mechanism. For example, droop values entered into an HVAC controller via a communication link may be modified via manual entry via a user interface, or vice versa.

In some illustrative embodiments, an HVAC controller may be configured to control an HVAC system without a programmable schedule such as that of FIG. 2. In such embodiments, the HVAC controller/thermostat may be configured to control the HVAC system with the use of droop values in steady state and/or manual setpoint change conditions as discussed herein.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. An HVAC controller configured to control one or more pieces of HVAC equipment of an HVAC system, the HVAC equipment capable of modifying a temperature of an inside space with at least a primary stage and an auxiliary stage, the HVAC controller comprising:

a user interface including a display, the user interface configured to allow a user to make a selection of one of three or more qualitatively expressed comfort versus economy settings displayed on a single screen; and a controller operatively coupled to the user interface, the controller is configured to relate the selected qualitatively expressed comfort versus economy setting to one or more corresponding quantitative control parameter values, and to control the primary stage and the auxiliary stage using the one or more corresponding quantitative control parameter values to control the temperature of the inside space with the primary stage of the HVAC equipment and to activate the auxiliary stage when the primary stage is deemed to not be providing a desired level of comfort in the inside space based at least in part on the one or more quantitative control parameter values that correspond to the selected qualitatively expressed comfort versus economy setting.

2. The HVAC controller of claim 1, wherein the HVAC controller is configured to control the one or more pieces of HVAC equipment of the HVAC system under at least three conditions including a steady state condition, a programmed recovery condition, and a manual setpoint change condition, and wherein the user interface is configured to accept a designated qualitatively expressed comfort versus economy setting for each of the at least three conditions;

the controller is further configured to relate the qualitatively expressed comfort versus economy setting for each of at least three conditions to one or more corresponding quantitative control parameter values;

the controller is further configured to control the primary stage and the auxiliary stage in each of the at least three conditions using the one or more quantitative control parameter values that correspond to the corresponding one of the at least three conditions and to control the temperature of the inside space with the primary stage of the HVAC equipment and to activate the auxiliary stage when the primary stage is deemed to not be providing a desired level of comfort in the inside space based at least in part on the one or more quantitative control parameter values for the corresponding one of the at least three conditions.

3. The HVAC controller of claim 1, wherein the user interface includes one or more buttons, and wherein the controller is configured to display on the display a currently selected qualitatively expressed comfort versus economy setting and to receive input from the one or more buttons to change the current qualitatively expressed comfort versus economy setting.

4. The HVAC controller of claim 1, wherein the user interface includes a slider, and wherein the controller is configured to display on the display a currently selected qualitatively expressed comfort versus economy setting and to receive input from the slider to change the qualitatively expressed current comfort versus economy setting.

5. The HVAC controller of claim 1, wherein the controller is configured to simultaneously display on the display a currently selected qualitatively expressed comfort versus economy setting and one or more of the other qualitatively expressed comfort versus economy setting for selection by the user.

6. The HVAC controller of claim 1, wherein one or more of the corresponding quantitative control parameter values comprises a droop value.

7. The HVAC controller of claim 1, wherein the auxiliary stage is less economical than the primary stage.

8. An HVAC controller configured to control one or more pieces of HVAC equipment of an HVAC system, the HVAC equipment capable of modifying a temperature of an inside space with at least a first stage and a second stage, the HVAC controller comprising:

a memory for storing a comfort versus economy setting, wherein the comfort versus economy setting is one of three or more different comfort versus economy settings that are available for selection by a user, wherein each of the three or more different comfort versus economy settings is associated with a different droop value;

a user interface including a display; and a controller operatively coupled to the memory;

wherein the controller is configured to display on the display the three or more different comfort versus economy settings along a qualitatively expressed scale on a single screen, the user interface is configured to accept the selection of a comfort versus economy setting from the user, the controller is further configured to relate the selected comfort versus economy setting to the corresponding droop value, and to control the primary stage and the auxiliary stage using the corresponding droop value to control the temperature of the inside space with the first stage of the HVAC equipment and to activate the second stage when the primary stage is deemed to not be providing a desired level of comfort in the inside space based at least in part on the corresponding droop value.

9. The HVAC controller of claim 8, wherein the user interface includes one or more buttons, and wherein the controller is configured to display on the display a current comfort versus economy setting and to receive input from the one or more buttons to change the current comfort versus economy setting.

10. The HVAC controller of claim 8, wherein the user interface includes a slider, and wherein the controller is configured to display on the display a current comfort versus economy setting and to receive input from the slider to change the current comfort versus economy setting.

11. The HVAC controller of claim 8, wherein the controller is configured to simultaneously display on the display a current comfort versus economy setting and one or more alternative comfort versus economy setting for selection by the user.

12. The HVAC controller of claim 8, wherein the comfort versus economy setting is one of four or more different comfort versus economy settings that are available for selection by a user.

13. The HVAC controller of claim 8, wherein the first stage is a primary stage and the second stage is an auxiliary stage of the HVAC system.

14. The HVAC controller of claim 13, wherein the auxiliary stage is less economical to operate than the primary stage.

15. The HVAC controller of claim 8, wherein the HVAC controller is configured to control the one or more pieces of HVAC equipment of the HVAC system under at least two conditions including a steady state condition and a manual setpoint change condition, and wherein the memory stores a designated comfort versus economy setting for each of the at least two conditions;

the controller is further configured to relate the comfort versus economy setting for each of at least two conditions to a corresponding droop value;

the controller is further configured to subsequently control the primary stage and the auxiliary stage in each of the at least two conditions using the droop value that correspond to the corresponding one of the at least two conditions and to control the temperature of the inside space with the first stage of the HVAC equipment and to activate the second stage when the first stage is deemed to not be providing a desired level of comfort in the inside space based at least in part on the droop value for the corresponding one of the at least two conditions.

16. A computer readable medium having stored thereon in a non-transitory state a program code for execution by a device having a controller in communication one or more pieces of HVAC equipment of an HVAC system, the HVAC equipment capable of modifying a temperature of an inside space with at least a first stage and a second stage, the program code causing the device to execute a method comprising:

displaying three or more different comfort versus economy settings along a qualitative scale on a single screen of a display of a user interface, and allowing a user to select one of the three or more different comfort versus economy settings, wherein each of the three or more different comfort versus economy settings is associated with a different droop value;

attempting to control the temperature of the inside space with the first stage of the HVAC equipment;

determining if the primary stage is not providing a desired level of comfort in the inside space, wherein the desired level of comfort is dependent on the droop value associated with the comfort versus economy setting received from the user; and activating the second stage if it is determined that the primary stage is not providing the desired level of comfort in the inside space.

* * * * *